(12) United States Patent
Morimoto et al.

(10) Patent No.: US 12,296,641 B2
(45) Date of Patent: May 13, 2025

(54) CONNECTION MODULE

(71) Applicant: DENSO CORPORATION, Kariya (JP)

(72) Inventors: Masakazu Morimoto, Kariya (JP); Yasuhiro Mizuno, Kariya (JP); Masaki Uchiyama, Kariya (JP); Yuki Sugiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 468 days.

(21) Appl. No.: 17/691,270

(22) Filed: Mar. 10, 2022

(65) Prior Publication Data

US 2022/0194167 A1 Jun. 23, 2022

Related U.S. Application Data

(63) Continuation of application No. PCT/JP2020/033617, filed on Sep. 4, 2020.

(30) Foreign Application Priority Data

Sep. 13, 2019 (JP) .................................. 2019-166783
Sep. 1, 2020 (JP) .................................. 2020-146775

(51) Int. Cl.
*B60H 1/00* (2006.01)
*F25B 41/40* (2021.01)
*F25B 41/42* (2021.01)

(52) U.S. Cl.
CPC ..... *B60H 1/00342* (2013.01); *B60H 1/00571* (2013.01); *F25B 41/40* (2021.01); *F25B 41/42* (2021.01)

(58) Field of Classification Search
CPC .... B60H 2001/2296; B60H 2001/2278; B60H 1/00571; B60H 1/00342; B60H 1/00035;
(Continued)

(56) References Cited

U.S. PATENT DOCUMENTS 5,996,369 A 12/1999 Hirota
2011/0070142 A1* 3/2011 Lysenko ................. C01B 3/001
423/658.2
(Continued)

FOREIGN PATENT DOCUMENTS

CN 106103153 A 11/2016
CN 206095007 U 4/2017
(Continued)

*Primary Examiner* — Frantz F Jules
*Assistant Examiner* — Jason N Thompson

(57) ABSTRACT

A plurality of components of a refrigeration cycle are connected to a connection module. The connection module includes a body having a refrigerant flow path that constitutes a part of a refrigerant flow path in the refrigeration cycle. The refrigerant flow path includes a high-temperature-side flow path and a low-temperature-side flow path. The high-temperature-side flow path has a connection port to which a high-temperature-side component of the plurality of components, through which a high-pressure refrigerant of the refrigeration cycle flows, is connectable. The low-temperature-side flow path has a connection port to which a low-temperature-side component of the plurality of components, through which a refrigerant having a lower temperature than the high-pressure refrigerant flows, is connectable.

12 Claims, 11 Drawing Sheets

(58) Field of Classification Search
CPC ...... B60H 1/00485; B60H 2001/00307; B60H 1/00278
See application file for complete search history.

(56) References Cited

U.S. PATENT DOCUMENTS

| | | | |
|---|---|---|---|
| 2011/0203538 A1* | 8/2011 | Menier | F25B 49/027 |
| | | | 123/41.11 |
| 2015/0226360 A1 | 8/2015 | Souma et al. | |
| 2016/0023538 A1* | 1/2016 | Seccardini | B60H 1/00485 |
| | | | 62/225 |
| 2016/0123675 A1 | 5/2016 | Denoual | |
| 2016/0276722 A1* | 9/2016 | Ho | B32B 15/00 |
| 2016/0375740 A1 | 12/2016 | Duerr et al. | |
| 2018/0080693 A1 | 3/2018 | Wang et al. | |

FOREIGN PATENT DOCUMENTS

| | | | | |
|---|---|---|---|---|
| CN | 106711533 A | | 5/2017 | |
| CN | 207690970 U | | 8/2018 | |
| CN | 207994013 U | | 10/2018 | |
| CN | 208417696 U | | 1/2019 | |
| EP | 0895884 A2 | | 2/1999 | |
| JP | H06011203 A | | 1/1994 | |
| JP | H10-267464 A | | 10/1998 | |
| JP | 2004092734 A | | 3/2004 | |
| JP | 2010281224 A | | 12/2010 | |
| JP | 5972994 B2 | | 8/2016 | |
| JP | 6088708 B2 | | 3/2017 | |
| JP | 2019501068 A | * | 1/2019 | |
| JP | 2019105422 A | * | 6/2019 | |
| KR | 20190057770 A | * | 5/2019 | |
| WO | WO-2014046063 A1 | | 3/2014 | |
| WO | WO-2015140040 A1 | * | 9/2015 | ......... B60H 1/00278 |

* cited by examiner

CONNECTION MODULE

CROSS REFERENCE TO RELATED APPLICATION

The present application is a continuation application of International Patent Application No. PCT/JP2020/033617 filed on Sep. 4, 2020, which designated the U.S. and claims the benefit of priority from Japanese Patent Application No. 2019-166783 filed on Sep. 13, 2019 and Japanese Patent Application No. 2020-146775 filed on Sep. 1, 2020. The entire disclosures of all of the above applications are incorporated herein by reference.

TECHNICAL FIELD

The present disclosure relates to a connection module connecting plural components of a refrigeration cycle.

BACKGROUND ART

A refrigeration cycle includes components such as a compressor, a condenser, a decompressor, and an evaporator, and these components are connected by refrigerant pipes.

SUMMARY

According to an aspect of the present disclosure, a connection module to which a plurality of components in a refrigeration cycle are connected includes a body provided with a refrigerant flow path. The refrigerant flow path constitutes a part of a refrigerant flow path in the refrigeration cycle. The refrigerant flow path includes a high-temperature-side flow path and a low-temperature-side flow path. The high-temperature-side flow path has a connection port to which a high-temperature-side component of the plurality of components through which a high-pressure refrigerant of the refrigeration cycle flows is connectable. The low-temperature-side flow path has a connection port to which a low-temperature-side component of the plurality of components, through which a refrigerant having a lower temperature than the high-pressure refrigerant flows is connectable.

BRIEF DESCRIPTION OF DRAWINGS

The above and other objectives, features, and advantages of the present disclosure will be clarified by the detailed description below with reference to the accompanying drawings. The accompanying drawings are as follows.

EMBODIMENTS

Figure 1:
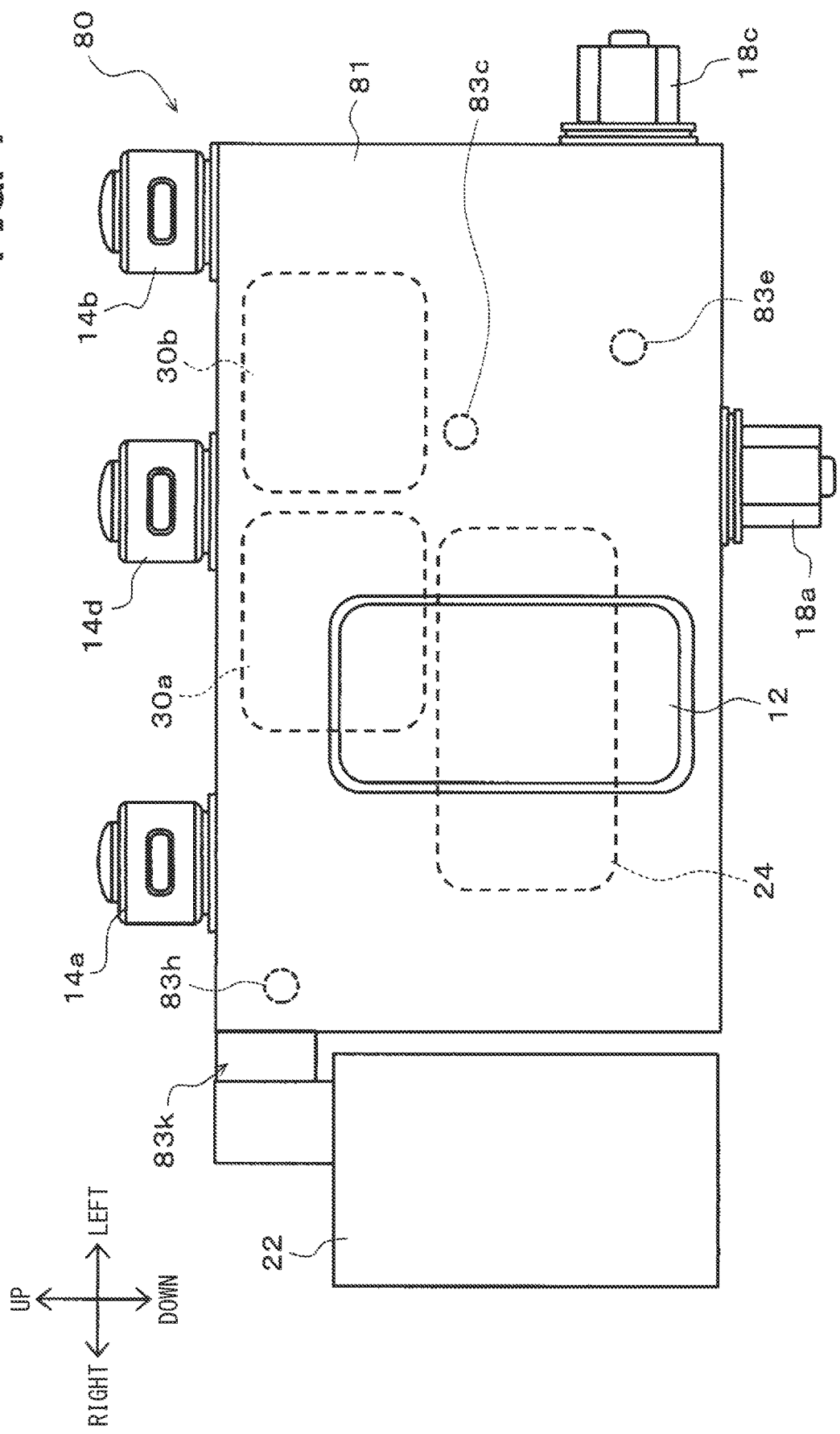
FIG. 1 is a front view of a connection module according to a first embodiment.

To begin with, examples of relevant techniques will be described.

Conventionally, a refrigeration cycle includes components such as a compressor, a condenser, a decompressor, and an evaporator, and these components are connected by refrigerant pipes as a technique for connecting a plurality of components in a refrigeration cycle. Alternatively, for example, an expansion valve as a decompressor and a heat exchanger functioning as an evaporator are aggregated and integrated.

However, since the expansion valve and the heat exchanger are integrated, the arrangement of the components and connection pipes in the refrigeration cycle is limited and dedicated, and it may not be possible to support various configurations of the refrigeration cycle. Therefore, it is considered that such a technique is not versatile for the configuration of the refrigeration cycle.

A refrigerant pipe connecting the expansion valve and the heat exchanger can be omitted, but other refrigerant pipes need to be connected separately. Therefore, it may not be possible to sufficiently support space saving for the refrigeration cycle as a whole.

The present disclosure has been made in view of the above points, relates to a connection module to which a plurality of components in a refrigeration cycle are connected, and provides a connection module capable of supporting various configurations of the refrigeration cycle.

According to an aspect of the present disclosure, a connection module to which a plurality of components in a refrigeration cycle are connected includes a body provided with a refrigerant flow path. The refrigerant flow path constitutes a part of a refrigerant flow path in the refrigeration cycle.

The refrigerant flow path includes a high-temperature-side flow path and a low-temperature-side flow path. The high-temperature-side flow path has a connection port to which a high-temperature-side component of the plurality of components through which a high-pressure refrigerant of the refrigeration cycle flows is connectable. The low-temperature-side flow path has a connection port to which a low-temperature-side component of the plurality of components, through which a refrigerant having a lower temperature than the high-pressure refrigerant flows is connectable.

Thus, a configuration of a high-temperature-side in the refrigeration cycle can be changed by using a connection port of a high-temperature-side flow path. Further, a configuration of a low-temperature-side in the refrigeration cycle can be changed by using a connection port of a low-temperature-side flow path. That is, it is possible to support various configurations of the refrigeration cycle by using the connection module.

It is possible to form a flow of a refrigerant to a high-temperature-side component via the high-temperature-side flow path and a flow of a refrigerant to a low-temperature-side component via the low-temperature-side flow path inside a body of the connection module. As a result, many parts of the flow of the refrigerant in the refrigeration cycle as a whole can be aggregated inside the connection module, which can contribute to space saving in the refrigeration cycle.

Embodiments of the present disclosure will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
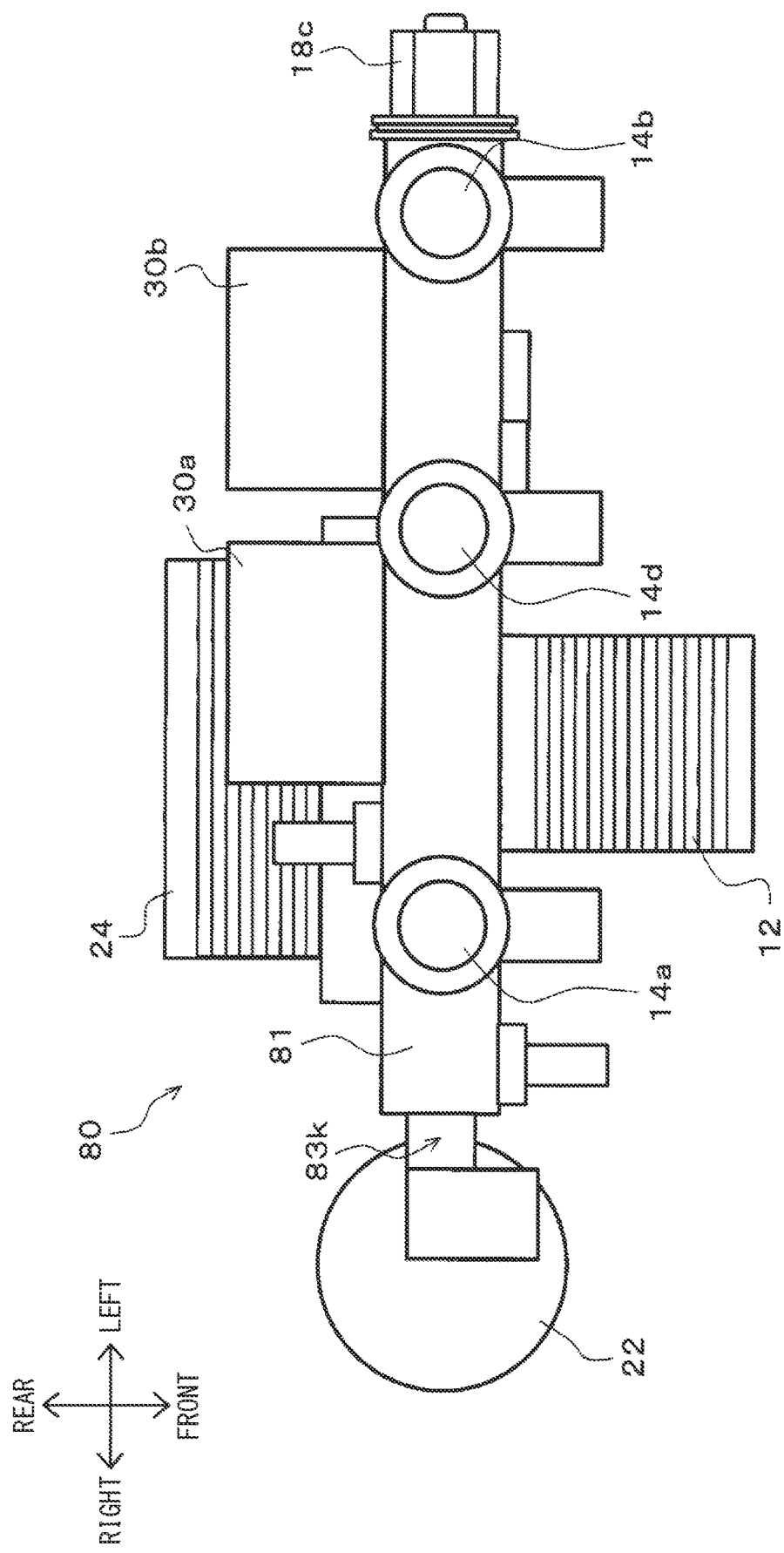
FIG. 2 is a top view of the connection module according to the first embodiment.

Embodiments for implementing the present disclosure will be described with reference to FIGS. 1 to 7. A connection module 80 according to a first embodiment is applied to a refrigeration cycle 10 constituting a vehicle air conditioner 1. As shown in FIGS. 1 and 2, the connection module 80 has a body 81 having a rectangular parallelepiped shape. Inside the body 81, a refrigerant flow path 82 through which a refrigerant circulating in the refrigeration cycle 10 flows is formed. A configuration of the refrigerant flow path 82 will be described later.

In the following description with use of front-rear, left-right, and up-down directions, a surface on which a water refrigerant heat exchanger 12 is disposed with respect to the body 81 having a rectangular parallelepiped shape is defined as a front surface, and the other directions are defined accordingly. The same definitions are used for the arrows shown in the drawings as appropriate.

The body 81 of the connection module 80 are provided with a plurality of connection ports (that is, first to eleventh connection ports 83a to 83k described later), to which components of the refrigeration cycle 10 (for example, the water refrigerant heat exchanger 12, a chiller 24, and the like described later) are connectable. As a result, the refrigerant flow path 82 of the connection module 80 constitutes a part of a flow path through which the refrigerant circulates in the refrigeration cycle 10.

An expansion valve and an open/close valve as fluid control devices can be attached to the body 81 of the connection module 80. Thus, the expansion valve and the open/close valve can be disposed on the refrigerant flow path 82, and the refrigerant circuit of the refrigeration cycle 10 can be changed.

First, the vehicle air conditioner 1 to which the connection module 80 according to the first embodiment is applied will be described. The vehicle air conditioner 1 is mounted on a hybrid vehicle that obtains driving force for vehicle traveling from an internal combustion engine (that is, an engine) and a traveling electric motor. The vehicle air conditioner 1 according to the first embodiment is a vehicle air conditioner with a cooling function of air-conditioning a vehicle interior as an air-conditioning target space and cooling a battery 48 as a cooling target in a hybrid automobile.

The battery 48 is a secondary battery that stores electric power supplied to an in-vehicle device such as an electric motor. The battery 48 is an assembled battery formed by electrically connecting a plurality of battery cells in series or in parallel.

The battery cell is a rechargeable secondary battery. In the first embodiment, a lithium ion battery is adopted as the battery cell. Each battery cell has a flat rectangular parallelepiped shape. Each battery cell is stacked and integrated to have flat surfaces facing each other. Therefore, the battery 48 as a whole has a substantially rectangular parallelepiped shape.

Output of this type of battery 48 tends to decrease at low temperatures and deteriorate easily at high temperatures. Therefore, temperature of the battery 48 needs to be maintained within an appropriate temperature range in which the battery 48 can exhibit sufficient charge/discharge performance (15° C. or higher and 55° C. or lower in the first embodiment).

In the battery 48 formed by electrically connecting the plurality of battery cells, when performance of any of the battery cells deteriorates, performance of the assembled battery as a whole deteriorates. Therefore, when the battery 48 is cooled, it is desirable to cool all the battery cells evenly.

Figure 3:
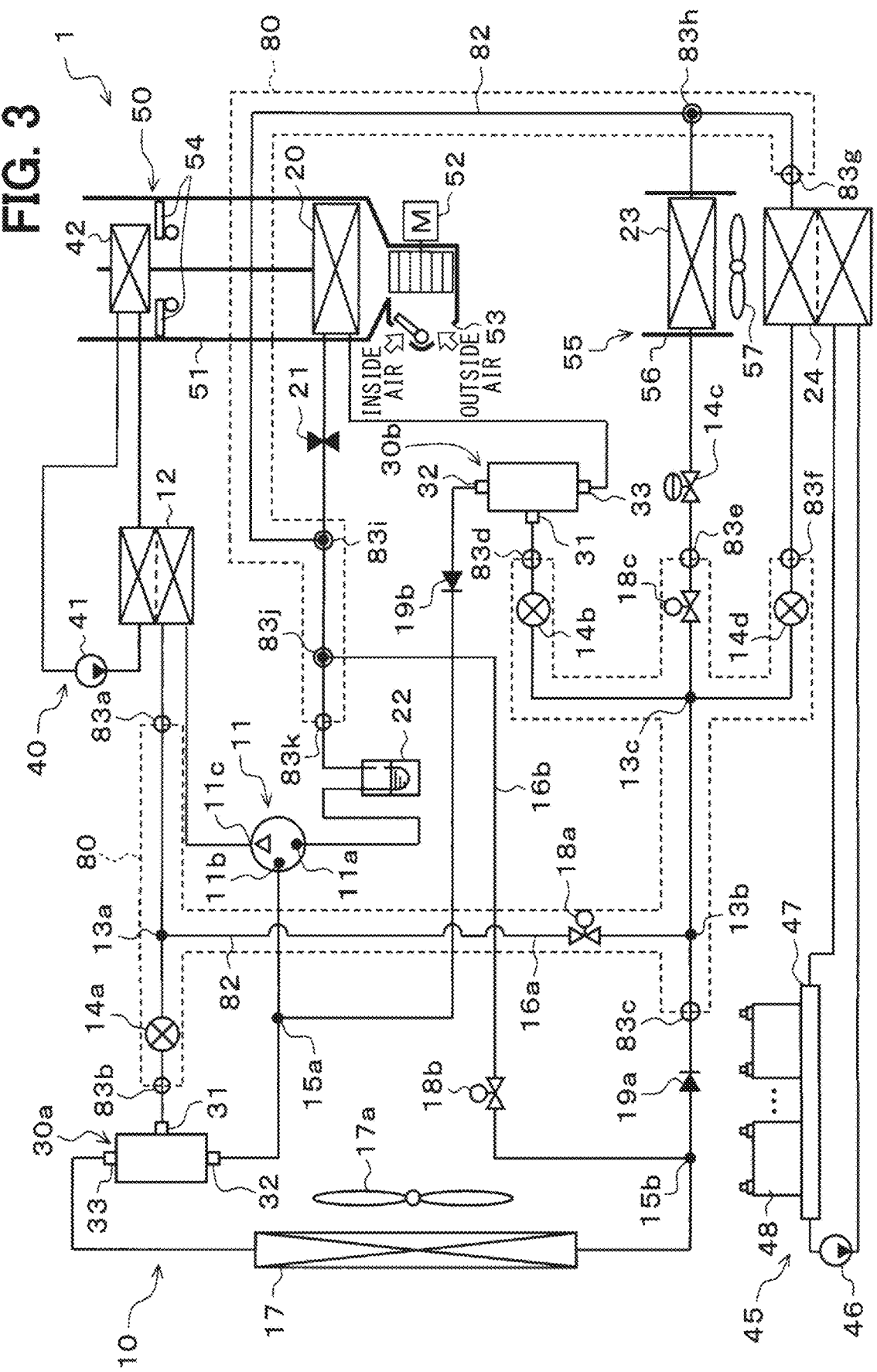
FIG. 3 is an overall configuration diagram of a vehicle air conditioner using the connection module according to the first embodiment.

As shown in an overall configuration diagram in FIG. 3, the vehicle air conditioner 1 according to the first embodiment includes the refrigeration cycle 10, a high-temperature-side heat medium circuit 40, a low-temperature-side heat medium circuit 45, an indoor air-conditioning unit 50, a rear seat air-conditioning unit 55, and the like. The vehicle air conditioner 1 includes the indoor air-conditioning unit 50 that air-conditions an entire vehicle interior and the rear seat air-conditioning unit 55 that mainly air-conditions a rear seat side of the vehicle interior, and thus the vehicle air conditioner 1 corresponds to a dual air conditioner.

First, the refrigeration cycle 10 will be described. The refrigeration cycle 10 cools or heats blown air blown into the vehicle interior in order to air-condition the vehicle interior as the air-conditioning target space in the vehicle air conditioner 1. Thus, a temperature control target fluid in the refrigeration cycle 10 is blown air. The refrigeration cycle 10 can switch the air conditioning in the vehicle interior between a refrigerant circuit in a cooling mode, a refrigerant circuit in a series dehumidifying and heating mode, a refrigerant circuit in a parallel dehumidifying and heating mode, and a refrigerant circuit in a heating mode.

In the vehicle air conditioner 1, the cooling mode is an operation mode in which the vehicle interior is cooled by cooling the blown air and blowing the cooled blown air into the vehicle interior. The series dehumidifying and heating mode is an operation mode in which the vehicle interior is dehumidified and heated by reheating the cooled and dehumidified blown air and blowing the reheated blow air into the vehicle interior. The parallel dehumidifying and heating mode is an operation mode in which the vehicle interior is dehumidified and heated by reheating the cooled and dehumidified blown air with a heating capacity higher than a heating capacity of the series dehumidifying and heating mode and blowing the reheated blown air into the vehicle interior. The heating mode is an operation mode in which the vehicle interior is heated by heating the blown air and blowing the heated blown air into the vehicle interior.

In the refrigeration cycle 10, an HFO-based refrigerant (specifically, R1234yf) is used as the refrigerant. The refrigeration cycle 10 constitutes a steam-compression subcritical refrigeration cycle in which a pressure of a high-pressure refrigerant discharged from a compressor 11 does not exceed a critical pressure of the refrigerant. Refrigerating machine oil for lubricating the compressor 11 is mixed in the refrigerant. As the refrigerating machine oil, polyalkylene glycol oil (PAG oil) having compatibility with a liquid-phase refrigerant is adopted. Part of the refrigerating machine oil circulates in the refrigeration cycle 10 together with the refrigerant.

Of the components of the refrigeration cycle 10, the compressor 11 sucks in the refrigerant in the refrigeration cycle 10, compresses the refrigerant, and discharges the compressed refrigerant. The compressor 11 is disposed in a drive unit chamber that accommodates the internal combustion engine, the traveling electric motor, and the like. The drive unit chamber is disposed in a front part of the vehicle interior.

The compressor 11 accommodates two compression mechanisms including a low-stage compression mechanism and a high-stage compression mechanism and an electric motor that rotationally drives both compression mechanisms inside a housing forming an outer shell of the compressor 11. That is, the compressor 11 is a two-stage step-up electric compressor. A rotation speed (that is, a refrigerant discharge capacity) of the compressor 11 is controlled by a control signal output from an air conditioning control device 60 described later.

The housing of the compressor 11 is provided with a suction port 11a, an intermediate pressure port 11b, and a discharge port 11c. The suction port 11a is a suction port for sucking a low-pressure refrigerant from outside of the housing to the low-stage compression mechanism. The discharge port 11c is a discharge port for discharging the high-pressure refrigerant discharged from the high-stage compression mechanism to outside of the housing.

The intermediate pressure port 11b is an intermediate pressure suction port for allowing an intermediate pressure refrigerant to flow from outside to inside of the housing and merging with the refrigerant in a compression process from low pressure to high pressure. The intermediate pressure port 11b is connected to a discharge port side of the low-stage compression mechanism and a suction port side of the high-stage compression mechanism inside the housing.

An inlet side of a refrigerant passage of the water refrigerant heat exchanger 12 is connected to the discharge port 11c of the compressor 11 via a refrigerant pipe. The water refrigerant heat exchanger 12 has a refrigerant passage for circulating the high-pressure refrigerant discharged from the compressor 11 and a water passage for circulating a high-temperature-side heat medium circulating in the high-temperature-side heat medium circuit 40.

The water refrigerant heat exchanger 12 is a heat exchanger for heating that heats the high-temperature-side heat medium by exchanging heat between the high-pressure refrigerant flowing through the refrigerant passage and the high-temperature-side heat medium flowing through the water passage, and is an example of high-temperature-side components. The details of the high-temperature-side heat medium circuit 40 will be described later.

The first connection port 83a of the connection module 80 is connected to a refrigerant outlet of the water refrigerant heat exchanger 12. Thus, the high-pressure refrigerant flowing out from the refrigerant outlet of the water refrigerant heat exchanger 12 flows into the refrigerant flow path 82 inside the connection module 80 from the first connection port 83a. A first flow path connection 13a is disposed in the refrigerant flow path 82 extending from a first connection port 83a.

As shown in FIG. 3, the first flow path connection 13a has three inflow and outflow ports communicating with each other. The first connection port 83a is connected to an inflow port side of the first flow path connection 13a via the refrigerant flow path 82. An inlet side of a heating expansion valve 14a is connected to one outflow port side of the first flow path connection 13a via the refrigerant flow path 82. A bypass flow path 16a as the refrigerant flow path 82 is connected to the other outflow port side of the first flow path connection 13a. That is, the first flow path connection 13a is configured as a branch that branches the flow of the refrigerant.

The heating expansion valve 14a is a decompressor that reduces the pressure of the high-pressure refrigerant flowing out from the water refrigerant heat exchanger 12 and adjusts a flow rate of the refrigerant flowing out to downstream in the heating mode or the like. The heating expansion valve 14a is an electric variable throttle mechanism having a valve body configured to change a throttle opening degree and an electric actuator that displaces the valve body.

The second connection port 83b of the connection module 80 is connected to an outlet of the heating expansion valve 14a via the refrigerant flow path 82. The heating expansion valve 14a is attached to the first attachment portion 84a formed in the body 81 of the connection module 80, and is disposed between one outflow port of the first flow path connection 13a and the second connection port 83b. This point will be described later. The operation of the heating expansion valve 14a is controlled by a control signal (control pulse) output from the air conditioning control device 60.

The heating expansion valve 14a further has a full open function and a full close function. The full open function can function as a mere refrigerant passage with almost no effect of adjusting the flow rate and reducing the pressure of the refrigerant by fully opening a valve opening degree. Then, the full close function can close the refrigerant passage by full close the valve opening degree. With the full open function and the full close function, the heating expansion valve 14a can switch the refrigerant circuit in each operation mode. Therefore, the heating expansion valve 14a also has a function as a refrigerant circuit switching part.

As shown in FIG. 3 and the like, the bypass flow path 16a is formed inside the connection module 80, and the refrigerant flow path 82 that connects the other outflow port of the first flow path connection 13a and one inflow port of a second flow path connection 13b.

A first open/close valve 18a is disposed in the bypass flow path 16a. The first open/close valve 18a is a solenoid valve that opens and closes the bypass flow path 16a, and is an example of high-temperature-side components. The first open/close valve 18a is attached to a fourth attachment portion 84d formed in the body 81 and is disposed in the bypass flow path 16a. The operation of the first open/close valve 18a is controlled by a control voltage output from the air conditioning control device 60.

An inflow port 31 of a heating integrated valve 30a is connected to the second connection port 83b of the connection module 80 via a refrigerant pipe. The heating integrated valve 30a is an integrated valve 30 that integrally constitutes a part of the component necessary for the refrigeration cycle 10 to function as a gas injection cycle in the heating mode of the vehicle air conditioner 1. Further, the heating integrated valve 30a functions as a refrigerant circuit switching part for switching the refrigerant circuit of the refrigerant circulating in the cycle, and is an example of a low-temperature-side component.

Here, the configuration of the heating integrated valve 30a will be described with reference to FIG. 4. The vehicle air conditioner 1 according to the first embodiment has a cooling integrated valve 30b basically configured in a similar manner. In the following description, the heating integrated valve 30a and the cooling integrated valve 30b will be collectively referred to as the integrated valve 30, and the configuration of the integrated valve 30 will be specifically described.

Figure 4:
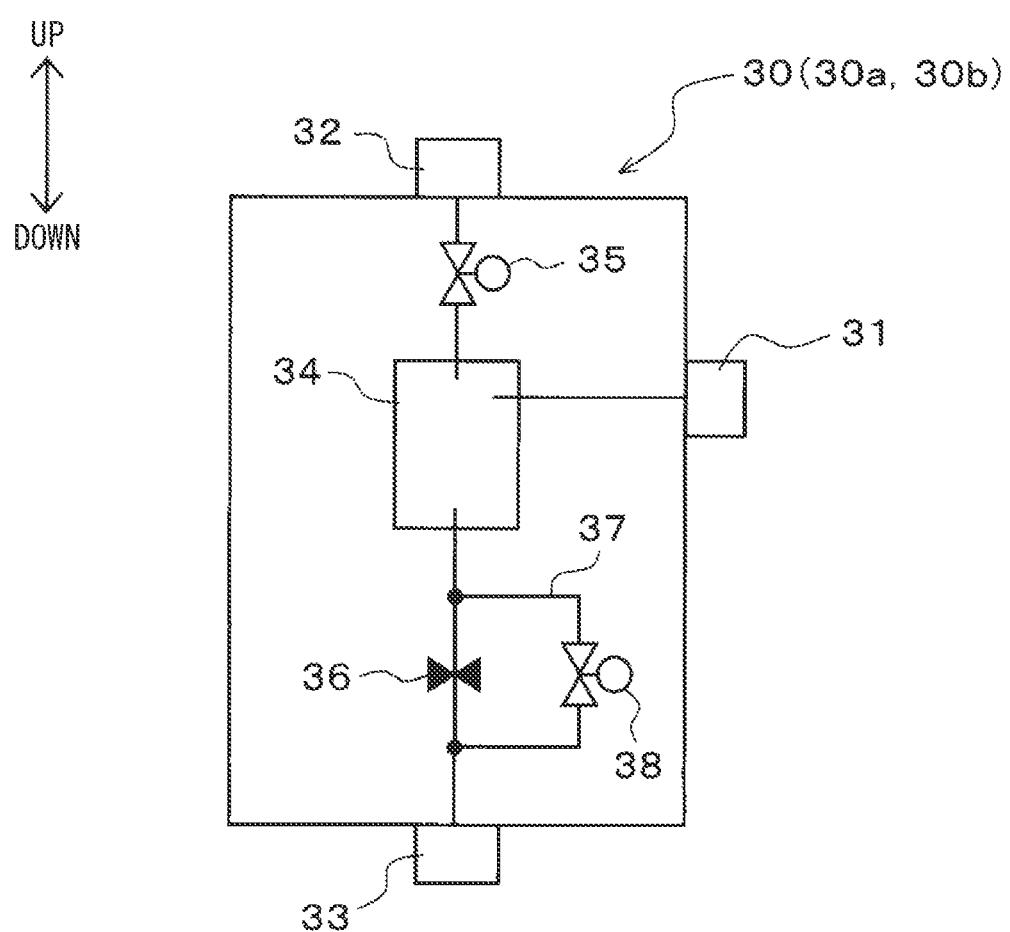
FIG. 4 is a configuration diagram of an integrated valve in the vehicle air conditioner according to the first embodiment.

As shown in FIG. 4, the integrated valve 30 has the inflow port 31 into which the refrigerant flows, a first outflow port 32 to which a gas-phase refrigerant flows out, and a second outflow port 33 to which the liquid-phase refrigerant flows out. An inlet side of the gas-liquid separator 34 is connected to the inflow port 31 of the integrated valve 30.

The gas-liquid separator 34 is a gas-liquid separator that separates a gas and liquid of the refrigerant flowing in from the inflow port 31. In the first embodiment, as the gas-liquid separator 34, a centrifugal separation method (so-called cyclone separator method) is adopted in which the gas and liquid of the refrigerant are separated by action of a centrifugal force generated by swirling the refrigerant flowing into an internal space of a cylindrical body.

Further, in the first embodiment, the gas-liquid separator 34 having a relatively small internal volume is adopted. Specifically, the internal volume of the gas-liquid separator 34 is set such that even when a load fluctuates in the cycle and the flow rate of the refrigerant circulating in the cycle fluctuates, a surplus refrigerant cannot be substantially stored. Therefore, the gas-liquid separator 34 does not function as a liquid storage that stores the separated liquid-phase refrigerant as a surplus refrigerant in the cycle.

A gas-phase refrigerant outlet of the gas-liquid separator 34 is connected to the first outflow port 32 of the integrated valve 30 via a gas-phase side open/close valve 35. The gas-phase side open/close valve 35 is an open/close valve that opens and closes a refrigerant passage that guides the gas-phase refrigerant flowing out from the gas-liquid separator 34 to the first outflow port 32.

The intermediate pressure port 11b of the compressor 11 is connected to the first outflow port 32 via a refrigerant pipe and a first three-way joint 15a. Therefore, the gas-phase refrigerant flowing out from the first outflow port 32 is guided to the intermediate pressure port 11b of the compressor 11.

An inlet side of a fixed throttle 36 is connected to a liquid-phase refrigerant outlet of the gas-liquid separator 34. The fixed throttle 36 decompresses the liquid-phase refrigerant flowing out from the gas-liquid separator 34 until the liquid-phase refrigerant becomes a low-pressure refrigerant. As the fixed throttle 36, a nozzle, an orifice, a capillary tube, or the like having a fixed throttle opening degree can be adopted. The second outflow port 33 of the integrated valve 30 is connected to an outlet side of the fixed throttle 36.

Further, a detour flow path 37 is connected to the liquid-phase refrigerant outlet of the gas-liquid separator 34. The detour flow path 37 is a refrigerant passage that guides the liquid-phase refrigerant flowing out from the gas-liquid separator 34 to the second outflow port 33 of the integrated valve 30 by bypassing the fixed throttle 36. A detour flow path side open/close valve 38 is disposed in the detour flow path 37. The detour flow path side open/close valve 38 is an open/close valve that opens and closes the detour flow path 37.

Here, a pressure loss generated when the refrigerant passes through the detour flow path side open/close valve 38 is extremely smaller than a pressure loss generated when the refrigerant passes through the fixed throttle 36. Therefore, when the detour flow path side open/close valve 38 is opened, most of the liquid-phase refrigerant flowing out from the gas-liquid separator 34 is guided to the second outflow port 33 via the detour flow path 37 without passing through the fixed throttle 36.

As described above, one inflow port of the first three-way joint 15a is connected to the first outflow port 32 of the heating integrated valve 30a via a refrigerant pipe. The first three-way joint 15a has a three-way joint structure having three inflow and outflow ports. In the first three-way joint 15a, two of the three inflow and outflow ports are used as the refrigerant inflow ports and the remaining one port is used as the refrigerant outflow port.

As the first three-way joint 15a, a joint formed by joining a plurality of pipes or a joint formed by providing a plurality of refrigerant passages in a metal block or a resin block can be adopted.

The first outflow port 32 of the cooling integrated valve 30b described later is connected to the other inflow port of the first three-way joint 15a. The intermediate pressure port 11b of the compressor 11 is connected to the outflow port of the first three-way joint 15a via a refrigerant pipe.

As shown in FIG. 3, a refrigerant inlet side of an outdoor heat exchanger 17 is connected to the second outflow port 33 of the heating integrated valve 30a via a refrigerant pipe. The outdoor heat exchanger 17 is a heat exchanger that exchanges heat between the refrigerant flowing out from the heating expansion valve 14a and outside air blown from an outside air fan 17a. The outdoor heat exchanger 17 is disposed in the front part of the drive unit chamber. Therefore, when the vehicle is traveling, traveling wind can be applied to the outdoor heat exchanger 17.

The outdoor heat exchanger 17 functions as a radiator that dissipates heat from the high-pressure refrigerant in the cooling mode or the like. In this case, the outdoor heat exchanger 17 corresponds to a high-temperature-side component. In the heating mode or the like, the outdoor heat exchanger 17 functions as an evaporator that evaporates the low-pressure refrigerant decompressed by the heating expansion valve 14a. In this case, the outdoor heat exchanger 17 is a low-temperature-side component and corresponds to an example of a main evaporator. The outside air fan 17a is an electric blower whose rotation speed (that is, blowing capacity) is controlled by the control voltage output from the air conditioning control device 60.

An inflow port side of a second three-way joint 15b is connected to a refrigerant outlet of the outdoor heat exchanger 17 via a refrigerant pipe. The second three-way joint 15b is configured in a similar manner to the first three-way joint 15a and has three inflow and outflow ports. An inflow port side of the first check valve 19a is connected to one outflow port of the second three-way joint 15b via a refrigerant pipe. A heating flow path 16b configured by a refrigerant pipe is connected to the other outflow port of the second three-way joint 15b.

An outflow port side of the first check valve 19a is connected to the third connection port 83c of the connection module 80 via a refrigerant pipe. The first check valve 19a allows the refrigerant to flow from the second three-way joint 15b (that is, a refrigerant outlet side of the outdoor heat exchanger 17) toward the third connection port 83c (that is, the inside of the connection module 80) and restricts the refrigerant from flowing from the third connection port 83c toward the second three-way joint 15b. The first check valve 19a corresponds to a low-temperature-side component.

The heating flow path 16b is a refrigerant passage that connects one outflow port of the second three-way joint 15b to the tenth connection port 83j of the connection module 80. The heating flow path 16b is constituted by a refrigerant pipe. A second open/close valve 18b is disposed in the heating flow path 16b. The second open/close valve 18b is a solenoid valve that opens and closes the heating flow path 16b. The second open/close valve 18b corresponds to a low-temperature-side component. The operation of the second open/close valve 18b is controlled by the control voltage output from the air conditioning control device 60.

Inside the connection module 80, the second flow path connection 13b is disposed in the refrigerant flow path 82 extending from the third connection port 83c. The second flow path connection 13b has three inflow and outflow ports that communicate with each other. As described above, the bypass flow path 16a is connected to one inflow port of the second flow path connection 13b. A third connection port 83c is connected to the other inflow port of the second flow path connection 13b via the refrigerant flow path 82. An inflow port side of a third flow path connection 13c is connected to an outflow port side of the second flow path connection 13b via the refrigerant flow path 82.

The third flow path connection 13c is configured as a branch having three outflow ports for one inflow port inside the connection module 80. An inlet side of a first cooling expansion valve 14b is connected to one outflow port of the third flow path connection 13c via the refrigerant flow path 82. An inlet side of a third open/close valve 18c is connected to the other outflow port of the third flow path connection 13c via the refrigerant flow path 82. Further, an inlet side of a refrigerating expansion valve 14d is connected to another outflow port of the third flow path connection 13c via the refrigerant flow path 82.

The first cooling expansion valve 14b is a decompressor that reduces the pressure of the refrigerant flowing out from the third flow path connection 13c and adjusts the flow rate of the refrigerant flowing out to downstream in the cooling mode or the like. The first cooling expansion valve 14b is an electric variable throttle mechanism configured in a similar manner to the heating expansion valve 14a. Therefore, the operation of the first cooling expansion valve 14b is controlled by a control signal (control pulse) output from the air conditioning control device 60.

Since the first cooling expansion valve 14b has the full open function and the full close function, the refrigerant circuit of each operation mode can be switched. Therefore, the first cooling expansion valve 14b also has a function as a refrigerant circuit switching part.

The fourth connection port 83d of the connection module 80 is connected to an outlet of the first cooling expansion valve 14b via the refrigerant flow path 82. The first cooling expansion valve 14b is attached to a second attachment portion 84b formed in the body 81 of the connection module 80, and is disposed between one outflow port of the third flow path connection 13c and the fourth connection port 83d.

Next, the third open/close valve 18c is a solenoid valve that opens and closes the refrigerant flow path 82 extending from the other outflow port of the third flow path connection 13c. The third open/close valve 18c is an example of a high-temperature-side component. An outlet side of the third open/close valve 18c is connected to the fifth connection port 83e of the connection module 80 via the refrigerant flow path 82.

The third open/close valve 18c is attached to a fifth attachment portion 84e formed in the body 81, and is disposed between the other outflow port of the third flow path connection 13c and the fifth connection port 83e. The operation of the third open/close valve 18c is controlled by the control voltage output from the air conditioning control device 60.

The refrigerating expansion valve 14d is a decompressor that reduces the pressure of the refrigerant flowing out from the third flow path connection 13c and adjusts the flow rate of the refrigerant flowing out to downstream when the battery 48 described later is cooled. The refrigerating expansion valve 14d is an electric variable throttle mechanism configured in a similar manner to the heating expansion valve 14a and the first cooling expansion valve 14b. Therefore, the operation of the refrigerating expansion valve 14d is controlled by a control signal (control pulse) output from the air conditioning control device 60.

Since the refrigerating expansion valve 14d has the full open function and the full close function, the refrigerant circuit in each operation mode can be switched. Therefore, the refrigerating expansion valve 14d also has a function as a refrigerant circuit switching part.

The sixth connection port 83f of the connection module 80 is connected to an outlet of the refrigerating expansion valve 14d via the refrigerant flow path 82. The refrigerating expansion valve 14d is attached to a third attachment portion 84c formed in the body 81 of the connection module 80, and thus is disposed between another outflow port of the third flow path connection 13c and the sixth connection port 83f.

As shown in FIG. 3, the inflow port 31 of the cooling integrated valve 30b is connected to the fourth connection port 83d of the connection module 80 via a refrigerant pipe. The cooling integrated valve 30b is configured in a similar manner as the heating expansion valve 14a described above. The cooling integrated valve 30b is an example of a low-temperature-side component.

As described with reference to FIG. 4, the cooling integrated valve 30b includes the inflow port 31, the first outflow port 32, the second outflow port 33, the gas-liquid separator 34, the gas-phase side open/close valve 35, and the fixed throttle 36, the detour flow path 37, and the detour flow path side open/close valve 38. The description of the detailed configuration of the cooling integrated valve 30b will not be repeated.

One inflow port of the first three-way joint 15a is connected to the first outflow port 32 of the cooling integrated valve 30b via a refrigerant pipe and a second check valve 19b. The second check valve 19b allows the refrigerant to flow from the first outflow port 32 of the cooling integrated valve 30b to the first three-way joint 15a, and restricts the refrigerant flows from flowing from the first three-way joint 15a to the cooling integrated valve 30b. Therefore, the gas-phase refrigerant flowing out from the first outflow port 32 of the cooling integrated valve 30b is guided to the intermediate pressure port 11b of the compressor 11 via the first three-way joint 15a.

On the other hand, a refrigerant inlet side of the indoor evaporator 20 is connected to the second outflow port 33 of the cooling integrated valve 30b via a refrigerant pipe. The indoor evaporator 20 is disposed in an air-conditioning casing 51 of the indoor air-conditioning unit 50 described later.

The indoor evaporator 20 exchanges heat between the low-pressure refrigerant decompressed by the first cooling expansion valve 14b and the blown air blown from the indoor blower 52, evaporates the low-pressure refrigerant to exert a heat absorbing action, and cools the blown air. The indoor evaporator 20 is a refrigerating heat exchanger, and is a main evaporator for cooling the entire vehicle interior. The indoor evaporator 20 is an example of a low-temperature-side component.

An inlet side of the evaporation pressure adjusting valve 21 is connected to a refrigerant outlet of the indoor evaporator 20 via a refrigerant pipe. The evaporation pressure adjusting valve 21 maintains the refrigerant pressure upstream thereof at a predetermined reference pressure or higher. In other words, the evaporation pressure adjusting valve 21 maintains an evaporation pressure of the refrigerant in the indoor evaporator 20 to be equal to or higher than the reference pressure. The evaporation pressure adjusting valve 21 is an example of a low-temperature-side component.

The evaporation pressure adjusting valve 21 is configured by a mechanical variable throttle mechanism that increases the valve opening degree as the pressure of the refrigerant on an outlet side of the indoor evaporator 20 increases. Further, the evaporation pressure adjusting valve 21 according to the first embodiment sets an evaporation temperature of the refrigerant in the indoor evaporator 20 to a frost formation suppression temperature (1° C. in the first embodiment) capable of suppressing frost formation in the indoor evaporator 20.

An outlet of the evaporation pressure adjusting valve 21 is connected to the ninth connection port 83*i* of the connection module 80 via a refrigerant pipe. Therefore, the refrigerant flowing out from the evaporation pressure adjusting valve 21 joins another refrigerant flow path 82 inside the connection module 80.

As shown in FIG. 3, an inflow port side of the second cooling expansion valve 14*c* is connected to the fifth connection port 83*e* of the connection module 80 via a refrigerant pipe. The second cooling expansion valve 14*c* is a decompressor that reduces the pressure of the refrigerant flowing out from the fifth connection port 83*e* of the connection module 80 until the refrigerant becomes a low-pressure refrigerant. A refrigerant inlet of the rear seat evaporator 23 of the rear seat air-conditioning unit 55 is connected to an outflow port side of the second cooling expansion valve 14*c* via a refrigerant pipe.

In the first embodiment, as the second cooling expansion valve 14*c*, a temperature-type expansion valve configured by a machine mechanism is adopted. Specifically, the second cooling expansion valve 14*c* has a temperature sensitive portion having a deforming member (specifically, a diaphragm) that deforms in accordance with a temperature and a pressure of the refrigerant on an outlet side of the rear seat evaporator 23, and a valve body that is displaced in accordance with the deformation of the deforming member and changes the throttle opening degree.

As a result, in the second cooling expansion valve 14*c*, the throttle opening degree is changed such that a superheat degree of the refrigerant on the outlet side of the rear seat evaporator 23 approaches a predetermined reference superheat degree (5° C. in the first embodiment). Here, the machine mechanism refers to a mechanism that operates by a load due to fluid pressure, a load due to an elastic member, or the like without requiring supply of electric power.

The rear seat evaporator 23 is an evaporator that exchanges heat between the low-pressure refrigerant decompressed by the second cooling expansion valve 14*c* and the blown air supplied from the rear seat air-conditioning unit 55 to rear seats of the vehicle interior, cools the blown air to evaporate the low-pressure refrigerant, and exerts the heat absorbing action. That is, the rear seat evaporator 23 is used for an air-conditioning operation in which a rear seat side of the vehicle interior is set as the air-conditioning target space.

The rear seat evaporator 23 is a secondary evaporator through which the low-pressure refrigerant flows when the low-pressure refrigerant flows through the indoor evaporator 20. A flow rate of the refrigerant passing through the rear seat evaporator 23 is smaller than a flow rate of the refrigerant passing through the indoor evaporator 20. The rear seat evaporator 23 is an example of the low-temperature-side component.

The eighth connection port 83*h* of the connection module 80 is connected to a refrigerant outlet side of the rear seat evaporator 23 via a refrigerant pipe. Therefore, the refrigerant flowing out from a refrigerant outlet of the rear seat evaporator 23 joins another refrigerant flow path 82 inside the connection module 80.

A refrigerant inlet side of the chiller 24 is connected to the sixth connection port 83*f* of the connection module 80. The chiller 24 has a refrigerant passage for circulating the low-pressure refrigerant decompressed by the refrigerating expansion valve 14*d*, and a water passage for circulating a low-temperature-side heat medium circulating in the low-temperature-side heat medium circuit 45. The details of the low-temperature-side heat medium circuit 45 will be described later.

The chiller 24 exchanges heat between the low-pressure refrigerant flowing through the refrigerant passage and the low-temperature-side heat medium flowing through the water passage, evaporates the low-pressure refrigerant, exerts the heat absorbing action, and cools the low-temperature-side heat medium. The chiller 24 is an evaporator that exchanges heat between the low-pressure refrigerant and the low-temperature-side heat medium and evaporates the low-pressure refrigerant. Therefore, the chiller 24 corresponds to a low-temperature-side component.

A flow rate of the refrigerant passing through the chiller 24 is smaller than a flow rate of the refrigerant passing through the outdoor heat exchanger 17 and the refrigerant flow rate passing through the indoor evaporator 20 in the heating mode described later. The seventh connection port 83*g* of the connection module 80 is connected to an outflow port of the refrigerant passage of the chiller 24.

Inside the connection module 80, the eighth connection port 83*h*, the ninth connection port 83*i*, and the tenth connection port 83*j* are disposed in the refrigerant flow path 82 extending from the seventh connection port 83*g*. The eleventh connection port 83*k* is disposed at a downstream end of the refrigerant flow path 82 extending from the seventh connection port 83*g*.

Thus, the refrigerant flowing out from the seventh connection port 83*g* joins the refrigerant flowing out from the rear seat evaporator 23 at the eighth connection port 83*h* and flows toward the eleventh connection port 83*k*. The refrigerant flowing out from the seventh connection port 83*g* joins the refrigerant that has passed through the indoor evaporator 20 and the evaporation pressure adjusting valve 21 at the ninth connection port 83*i*, and flows toward the eleventh connection port 83*k*. Further, the refrigerant flowing out from the seventh connection port 83*g* flows out from the outdoor heat exchanger 17 at the tenth connection port 83*j*, joins the refrigerant that has passed through the heating flow path 16*b*, and flows toward the eleventh connection port 83*k*.

An inlet side of an accumulator 22 is connected to the eleventh connection port 83*k* of the connection module 80. The accumulator 22 is a liquid storage that separates the gas and liquid of the refrigerant that has flowed inside and stores the separated liquid-phase refrigerant as a surplus refrigerant in the cycle. The accumulator 22 is an example of a low-temperature-side component. The suction port 11a of the compressor 11 is connected to a gas-phase refrigerant outlet of the accumulator 22 via a refrigerant pipe.

In the refrigeration cycle 10 according to the first embodiment, a path passing through the indoor evaporator 20, a path passing through the rear seat evaporator 23, and a path passing through the chiller 24 are connected in parallel to each other between the third flow path connection 13c and the eleventh connection port 83k. Therefore, it is possible to selectively implement cooling of the entire vehicle interior using the indoor evaporator 20, cooling of the rear seats of the vehicle interior using the rear seat evaporator 23, and cooling of the battery 48 using the chiller 24.

Next, the high-temperature-side heat medium circuit 40 constituting the vehicle air conditioner 1 will be described. The high-temperature-side heat medium circuit 40 is a heat medium circulation circuit that circulates the high-temperature-side heat medium. As the high-temperature-side heat medium, a solution including ethylene glycol, an antifreeze solution, or the like can be adopted. In the high-temperature-side heat medium circuit 40, the water passage of the water refrigerant heat exchanger 12, a high-temperature-side pump 41, a heater core 42, and the like are disposed.

The high-temperature-side pump 41 is a water pump that pumps the high-temperature-side heat medium to an inlet side of the water passage of the water refrigerant heat exchanger 12. The high-temperature-side pump 41 is an electric pump whose rotation speed (that is, pumping capacity) is controlled by the control voltage output from the air conditioning control device 60.

A heat medium inlet side of the heater core 42 is connected to an outlet of the water passage of the water refrigerant heat exchanger 12. The heater core 42 is a heat exchanger that exchanges heat between the high-temperature-side heat medium heated by the water refrigerant heat exchanger 12 and the blown air that has passed through the indoor evaporator 20 and heats the blown air. The heater core 42 is disposed in the air-conditioning casing 51 of the indoor air-conditioning unit 50. A suction port side of the high-temperature-side pump 41 is connected to a heat medium outlet of the heater core 42.

That is, in the first embodiment, each component of the water refrigerant heat exchanger 12 and the high-temperature-side heat medium circuit 40 constitutes a heating unit that heats the blown air using the refrigerant discharged from the compressor 11 as a heat source.

Subsequently, the low-temperature-side heat medium circuit 45 constituting the vehicle air conditioner 1 will be described. The low-temperature-side heat medium circuit 45 is a heat medium circulation circuit that circulates the low-temperature-side heat medium. As the low-temperature-side heat medium, a fluid similar to the high-temperature-side heat medium can be adopted.

The water passage of the chiller 24, a low-temperature-side pump 46, a battery cooler 47, and the like are disposed in the low-temperature-side heat medium circuit 45. The low-temperature-side pump 46 is a water pump that pumps the low-temperature-side heat medium to an inlet side of the water passage of the chiller 24. The low-temperature-side pump 46 has a similar basic configuration to the high-temperature-side pump 41.

An inlet side of the battery cooler 47 is connected to the outlet of the water passage of the chiller 24. The battery cooler 47 has a plurality of metal heat medium flow paths disposed to be in contact with the plurality of battery cells forming the battery 48. The battery cooler 47 is a heat exchange part that cools the battery 48 by exchanging heat between the low-temperature-side heat medium flowing through the heat medium flow paths and the battery cells.

Such a battery cooler 47 can be formed by arranging a heat medium flow path between the stacked battery cells. The battery cooler 47 may be integrally formed with the battery 48. For example, the battery 48 may be integrally formed by providing a heat medium flow path in a dedicated case that accommodates the stacked battery cells.

Next, the indoor air-conditioning unit 50 will be described. The indoor air-conditioning unit 50 is configured to blow out blown air adjusted to an appropriate temperature for entirely air-conditioning the vehicle interior to an appropriate location in the vehicle interior. The indoor air-conditioning unit 50 is disposed inside an instrument panel at a foremost part of the vehicle interior.

As shown in FIG. 3, the indoor air-conditioning unit 50 accommodates the indoor blower 52, the indoor evaporator 20, the heater core 42, and the like in the air-conditioning casing 51 that forms an air passage for the blown air. The air-conditioning casing 51 includes a resin (for example, polypropylene) having a certain degree of elasticity and excellent strength.

An inside/outside air switching device 53 is disposed most upstream of an airflow in the air-conditioning casing 51. The inside/outside air switching device 53 switches and introduces inside air (that is, air of the vehicle interior) and the outside air (that is, air outside the vehicle interior) into the air-conditioning casing 51.

The inside/outside air switching device 53 continuously adjusts an opening area of an inside air introduction port for introducing the inside air into the air-conditioning casing 51 and an outside air introduction port for introducing the outside air by an inside/outside air switching door, and changes an introduction ratio between an introduction air volume of the inside air and an introduction air volume of the outside air. The inside/outside air switching door is driven by an electric actuator for the inside/outside air switching door. This electric actuator is controlled by a control signal output from the air conditioning control device 60.

The indoor blower 52 is disposed downstream of the airflow of the inside/outside air switching device 53. The indoor blower 52 is configured by an electric blower that drives a centrifugal multi-blade fan with an electric motor. The indoor blower 52 blows the air sucked through the inside/outside air switching device 53 toward the vehicle interior. A blowing capacity (that is, rotation speed) of the indoor blower 52 is controlled by the control voltage output from the air conditioning control device 60.

The indoor evaporator 20 and the heater core 42 are disposed in that order in an airflow direction downstream of the airflow of the indoor blower 52. The indoor evaporator 20 is disposed upstream of the airflow of the heater core 42.

The air mix door 54 is disposed downstream of the airflow of the indoor evaporator 20 in the air-conditioning casing 51 and upstream of the airflow of the heater core 42. An air mix door 54 is an air volume ratio adjuster that adjusts the air volume ratio between the air passing through the heater core 42 and the air flowing by bypassing the heater core 42 among the air after passing through the indoor evaporator 20.

The air mix door 54 is driven by an electric actuator for an air mix door. This electric actuator is controlled by a control signal output from the air conditioning control device 60.

A mixing space is provided downstream of the airflow of the heater core 42. The mixing space is a space for mixing hot air that has passed through the heater core 42 and cold air that has flowed by bypassing the heater core 42.

An opening for blowing out the air mixed in the mixing space (that is, air-conditioning air) into the vehicle interior as the air-conditioning target space is disposed downstream of the airflow in the air-conditioning casing 51. As the opening of the air-conditioning casing 51, a face opening, a foot opening, and a defroster opening (none of which are shown) are provided.

The face opening is an opening for blowing the air-conditioning air toward an upper body of an occupant in the vehicle interior. The foot opening is an opening for blowing the air-conditioning air toward feet of the occupant. The defroster opening is an opening for blowing the air-conditioning air toward an inner surface of a front window glass of the vehicle.

The face opening, the foot opening, and the defroster opening are connected to a face blowout port, a foot blowout port, and a defroster blowout port (none of which are shown) provided in the vehicle interior via ducts forming air passages, respectively.

A temperature of the air-conditioning air mixed in the mixing space is adjusted by adjusting the air volume ratio between the air passing through the heater core 42 and the air bypassing the heater core 42 by the air mix door 54. As a result, the temperature of the air-conditioning air blown from each blowout port into the vehicle interior is adjusted.

A face door, a foot door, and a defroster door are disposed upstream of the airflow of the face opening, the foot opening, and the defroster opening, respectively. The face door adjusts an opening area of the face opening. The foot door adjusts an opening area of the foot opening. The defroster door adjusts an opening area of the defroster opening.

The face door, the foot door, and the defroster door are blowout port mode switching devices that switch a blowout port mode. These doors are connected to an electric actuator for driving a blowout port mode door via a link mechanism or the like, and are rotated in conjunction with each other. This electric actuator is controlled by a control signal output from the air conditioning control device 60.

Specific examples of the blowout port modes that can be switched by the blowout port mode switching devices include a face mode, a bi-level mode, a foot mode, and the like.

The face mode is a blowout port mode in which the face blowout port is fully opened and air is blown from the face blowout port toward the upper body of the occupant in the vehicle interior. The bi-level mode is a blowout port mode in which both the face blowout port and the foot blowout port are opened to blow air toward the upper body and feet of the occupant in the vehicle interior. The foot mode is a blowout port mode in which the foot blowout port is fully opened and the defroster blowout port is opened by a small opening degree, and air is mainly blown out from the foot blowout port.

Subsequently, the rear seat air-conditioning unit 55 constituting the vehicle air conditioner 1 will be described. The rear seat air-conditioning unit 55 is provided in a rear part of the vehicle interior, for example, on a side of the rear seat. The rear seat air-conditioning unit 55 has a rear seat casing 56 that forms an air passage.

A rear seat blower 57 is disposed upstream of the rear seat casing 56. The rear seat blower 57 blows the inside air or the outside air as air-conditioning air from an inside/outside air switching box (not shown).

The rear seat evaporator 23 is disposed downstream of the airflow of the rear seat blower 57 in the rear seat casing 56. As described above, the rear seat evaporator 23 is a refrigerating heat exchanger that cools the blown air supplied to the rear seat of the vehicle interior, and is an example of a secondary evaporator.

Next, an outline of an electric controller according to the first embodiment will be described with reference to FIG. 5. The air conditioning control device 60 is configured by a well-known microcomputer including a CPU, ROM, RAM, and the like, and a peripheral circuit thereof. Then, the air conditioning control device 60 performs various calculations and processing on the basis of an air conditioning control program stored in the ROM, and controls an operation of various controlled devices connected to an output side of the air conditioning control device 60.

The controlled device in the vehicle air conditioner 1 is connected to the output side of the air conditioning control device 60. The controlled device includes the compressor 11, the heating expansion valve 14*a*, the first cooling expansion valve 14*b*, the refrigerating expansion valve 14*d*, the outside air fan 17*a*, the first open/close valve 18*a*, the second open/close valve 18*b*, and the third open/close valve 18*c*.

The controlled devices further include the heating integrated valve 30*a*, the cooling integrated valve 30*b*, the indoor blower 52, the rear seat blower 57, the high-temperature-side pump 41, the low-temperature-side pump 46, and the like. As described above, control targets at the heating integrated valve 30*a* are the gas-phase side open/close valve 35 and the detour flow path side open/close valve 38. Similarly, control targets at the cooling integrated valve 30*b* are the gas-phase side open/close valve 35 and the detour flow path side open/close valve 38.

Figure 5:
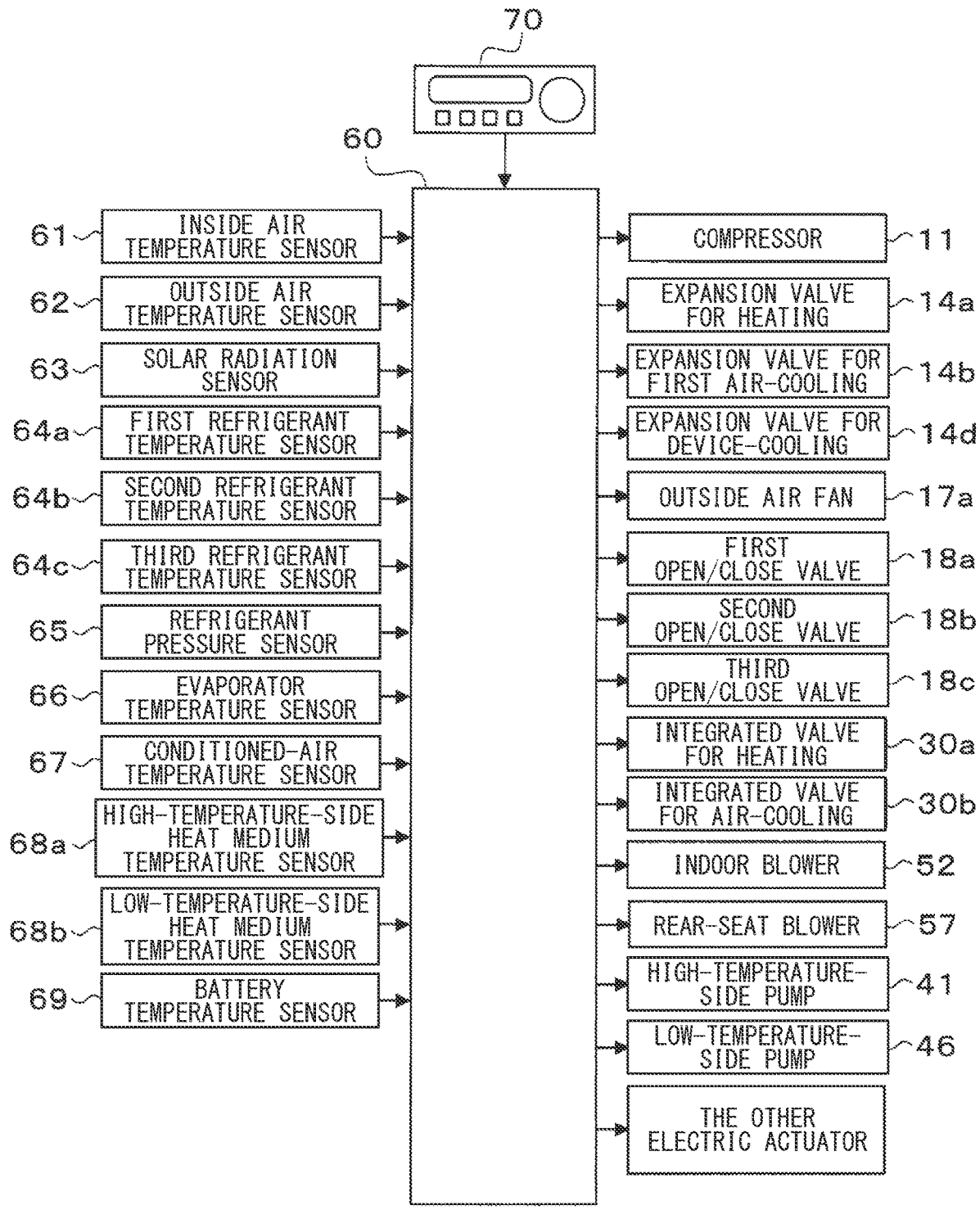
FIG. 5 is a block diagram showing an electric controller of the vehicle air conditioner according to the first embodiment.

As shown in FIG. 5, various sensors are connected to an input side of the air conditioning control device 60. Therefore, detection signals of the various sensors are input to the air conditioning control device 60. The various sensors include an inside air temperature sensor 61, an outside air temperature sensor 62, a solar radiation sensor 63, a first refrigerant temperature sensor 64*a*, a second refrigerant temperature sensor 64*b*, and a third refrigerant temperature sensor 64*c*. The various sensors further include an evaporator temperature sensor 66, a refrigerant pressure sensor 65, a conditioned-air temperature sensor 67, a high-temperature-side heat medium temperature sensor 68*a*, a low-temperature-side heat medium temperature sensor 68*b*, and a battery temperature sensor 69.

The inside air temperature sensor 61 is an inside air temperature detector that detects a temperature Tr in the vehicle interior (inside air temperature). The outside air temperature sensor 62 is an outside air temperature detector that detects a temperature Tam outside the vehicle interior (outside air temperature). The solar radiation sensor 63 is a solar radiation amount detector that detects a solar radiation amount Ts applied to the vehicle interior.

The first refrigerant temperature sensor 64*a* is a first refrigerant temperature detector that detects a temperature of the high-pressure refrigerant flowing out from the refrigerant passage of the water refrigerant heat exchanger 12. The second refrigerant temperature sensor 64*b* is a second refrigerant temperature detector that is disposed on the refrigerant outlet side of the outdoor heat exchanger 17 and detects a temperature of the refrigerant flowing out from the outdoor heat exchanger 17. Therefore, a second refrigerant temperature when the refrigerant flowing out from the outdoor heat exchanger 17 flows into the accumulator 22 via the heating flow path 16b is a temperature of the refrigerant flowing into the accumulator 22.

The third refrigerant temperature sensor 64c is a third refrigerant temperature detector that is disposed on an outlet side of the refrigerant passage of the chiller 24 and detects a temperature of the refrigerant flowing out from the refrigerant passage of the chiller 24. The refrigerant pressure sensor 65 is a refrigerant pressure detector that detects a high pressure Pd of the refrigerant flowing out from the water refrigerant heat exchanger 12. The evaporator temperature sensor 66 is an evaporator temperature detector that detects a refrigerant evaporation temperature (evaporator temperature) Tefin in the indoor evaporator 20. The evaporator temperature sensor 66 according to the first embodiment specifically detects a temperature of a heat exchange fin of the indoor evaporator 20.

The conditioned-air temperature sensor 67 is an air-conditioning air temperature detector that detects a temperature TAV of the blown air blown from the mixing space to the vehicle interior.

The high-temperature-side heat medium temperature sensor 68a is a high-temperature-side heat medium temperature detector that detects a high-temperature-side heat medium temperature as a temperature of the high-temperature-side heat medium flowing out from the water passage of the water refrigerant heat exchanger 12 and flowing into the heater core 42. A battery-side heat medium temperature sensor 67b is a low-temperature-side heat medium temperature detector that detects a low-temperature-side heat medium temperature as a temperature of the low-temperature-side heat medium flowing out from the water passage of the chiller 24 and flowing into the battery cooler 47.

The battery temperature sensor 69 is a battery temperature detector that detects a battery temperature (that is, a temperature of the battery 48). The battery temperature sensor 69 has a plurality of detectors, and detects temperatures of a plurality of points of the battery 48. Therefore, the air conditioning control device 60 can also detect a temperature difference of each part of the battery 48. Further, as the battery temperature, an average value of detected values by the plurality of detectors is adopted.

Further, as shown in FIG. 5, an operation panel 70 disposed near the instrument panel at a front part of the vehicle interior is connected to the input side of the air conditioning control device 60. Therefore, operation signals from various operation switches provided on the operation panel 70 are input to the air conditioning control device 60.

The various operation switches provided on the operation panel 70 include, for example, an auto switch, an air conditioner switch, an air volume setting switch, a temperature setting switch, a blowout mode changeover switch, and the like. The auto switch is operated when automatic control operation of the vehicle air conditioner 1 is set or cancelled. The air conditioner switch is operated when the indoor evaporator 20 or the like requests cooling of the blown air.

The air volume setting switch is operated when an air volume of the indoor blower 52 or the like is manually set. The temperature setting switch is operated when a target temperature Tset in the vehicle interior is set. Then, the blowout mode changeover switch is operated when the blowout mode is manually set.

The air conditioning control device 60 according to the first embodiment is integrally configured with a controller that controls various controlled devices connected to the output side of the air conditioning control device 60. That is, in the air conditioning control device 60, a configuration (hardware and software) that controls the operation of each controlled device constitutes the controller that controls the operation of each controlled device.

For example, in the air conditioning control device 60, a configuration that controls the rotation speed of the compressor 11 constitutes a discharge capacity controller. Further, in the air conditioning control devices 60, a configuration that controls the throttle opening degrees of the heating expansion valve 14a, the first cooling expansion valve 14b, and the refrigerating expansion valve 14d as decompressors constitutes a throttle opening degree controller.

Then, a configuration that controls the operation of the heating expansion valve 14a, the first cooling expansion valve 14b, the refrigerating expansion valve 14d, the first open/close valve 18a, the second open/close valve 18b, the third open/close valve 18c, the heating integrated valve 30a, and the cooling integrated valve 30b constitutes a circuit switching controller.

Next, the operation according to the first embodiment in the above configuration will be described. As described above, in the vehicle air conditioner 1 according to the first embodiment, cooling, dehumidifying and heating, and heating can be performed as air conditioning operation in the vehicle interior. Then, the vehicle air conditioner 1 can be operated in the cooling mode, the series dehumidifying and heating mode, the parallel dehumidifying and heating mode, and the heating mode in order to air-condition the vehicle interior.

The operation modes of the refrigeration cycle 10 can be switched by executing the air conditioning control program. The air conditioning control program is executed when the auto switch of the operation panel 70 is turned on and the automatic control operation is set.

In a main routine of the air conditioning control program, the detection signals of the sensors for air conditioning control described above and the operation signals from various air conditioning operation switches are read. Then, on the basis of values of the read detection signals and the operation signals, a target blowout temperature TAO as a target temperature of a blowout air blown into the vehicle interior is calculated.

Specifically, the target blowout temperature TAO is calculated by the following formula F1.

$$TAO = Kset \times Tset - Kr \times Tr - Kam \times Tam - Ks \times As + C \quad (F1)$$

Tset is the target temperature in the vehicle interior (vehicle interior set temperature) set by the temperature setting switch, Tr is the inside air temperature detected by the inside air temperature sensor 61, Tam is the outside air temperature detected by the outside air temperature sensor 62, and Ts is the solar radiation amount detected by the solar radiation sensor 63. Kset, Kr, Kam, and Ks are control gains, and C is a correction constant.

Then, when the target blowout temperature TAO is lower than a cooling reference temperature α determined in advance with the air conditioner switch of the operation panel 70 turned on, the operation mode is switched to the cooling mode.

When the target blowout temperature TAO is equal to or higher than the cooling reference temperature α, and the outside air temperature Tam is higher than a dehumidifying and heating reference temperature β determined in advance, with the air conditioner switch of the operation panel 70 turned on, the operation mode is switched to the series dehumidifying and heating mode.

When the target blowout temperature TAO is equal to or higher than the cooling reference temperature α, and the outside air temperature Tam is lower than or equal to the dehumidifying and heating reference temperature β, with the air conditioner switch of the operation panel 70 turned on, the operation mode is switched to the parallel dehumidifying and heating mode.

When the cooling switch of the air conditioner switch is not turned on, the operation mode is switched to the heating mode.

For this reason, the cooling mode is mainly executed when the outside air temperature is relatively high, such as in summer. The series dehumidifying and heating mode is mainly executed in spring or autumn. The parallel dehumidifying and heating mode is mainly executed when it is necessary to heat the blown air with a higher heating capacity than the series dehumidifying and heating mode, as in early spring or late autumn. The heating mode is mainly executed in low outside air temperatures in winter. The operation in each operation mode will be described below.

(a) Cooling Mode

In the cooling mode, the air conditioning control device 60 sets the heating expansion valve 14a and the refrigerating expansion valve 14d in a fully closed state, and sets the first cooling expansion valve 14b in a throttled state. Further, the air conditioning control device 60 opens the first open/close valve 18a and closes the second open/close valve 18b and the third open/close valve 18c. Then, the air conditioning control device 60 opens the gas-phase side open/close valve 35 of the cooling integrated valve 30b and closes the detour flow path side open/close valve 38.

In the cooling mode, the refrigerant flows through the discharge port 11c of the compressor 11, the water refrigerant heat exchanger 12, the first open/close valve 18a, the first cooling expansion valve 14b, the cooling integrated valve 30b, the indoor evaporator 20, the evaporation pressure adjusting valve 21, the accumulator 22, and the suction port 11a of the compressor 11 in that order.

Here, in the cooling integrated valve 30b in the cooling mode, the gas-phase side open/close valve 35 is open, and thus the gas-phase refrigerant separated by the gas-liquid separator 34 is guided to the intermediate pressure port 11b of the compressor 11 via the second check valve 19b. That is, in the cooling mode, the compressor 11 functions as a two-stage step-up compressor, and a so-called gas injection cycle is configured.

Further, the detour flow path side open/close valve 38 is closed in the cooling integrated valve 30b in the cooling mode, and thus the liquid-phase refrigerant flowing out from the gas-liquid separator 34 passes through the fixed throttle 36 and is decom pressed.

In the cooling mode, the air conditioning control device 60 appropriately determines the control signals and the like to be output to the various controlled devices connected to the output side in this cycle configuration, and outputs the determined control signals and the like to the various controlled devices.

Therefore, in the refrigeration cycle 10 in the cooling mode, a refrigeration cycle is configured in which the water refrigerant heat exchanger 12 functions as a condenser and the indoor evaporator 20 functions as an evaporator. As a result, in the cooling mode, the entire vehicle interior can be cooled by blowing out the blown air cooled by the indoor evaporator 20 into the vehicle interior.

When a rear seat side of the vehicle interior is cooled in the cooling mode, the air conditioning control device 60 opens the third open/close valve 18c from the state described in the cooling mode and operates the rear seat blower 57. As a result, the refrigerant flowing out from the first open/close valve 18a is decompressed by the second cooling expansion valve 14c via the third open/close valve 18c. The low-pressure refrigerant flowing out from the second cooling expansion valve 14c exchanges heat with the blown air blown by the rear seat blower 57 at the rear seat evaporator 23 to cool the blown air. This makes it possible to implement air conditioning on the rear seat side of the vehicle interior in the cooling mode.

Further, when the battery 48 is cooled in the cooling mode, the air conditioning control device 60 sets the refrigerating expansion valve 14d in the throttled state from a state in the cooling mode, and operates the low-temperature-side pump 46 with a pumping capacity determined in advance.

As a result, the refrigerant flowing out from the first open/close valve 18a is decompressed by the refrigerating expansion valve 14d and flows into the refrigerant passage of the chiller 24. The low-pressure refrigerant flowing into the chiller 24 exchanges heat with the low-temperature-side heat medium circulating in the water passage to cool the low-temperature-side heat medium. Then, the low-temperature-side heat medium flowing out from the chiller 24 exchanges heat with each battery cell of the battery 48 in the battery cooler 47 to cool the battery 48. Thus, the battery 48 can be cooled in the cooling mode.

(b) Series Dehumidifying and Heating Mode

In the series dehumidifying and heating mode, the air conditioning control device 60 sets the heating expansion valve 14a and the first cooling expansion valve 14b in the throttled state, and closes the refrigerating expansion valve 14d in the fully closed state. Further, the air conditioning control device 60 closes the first open/close valve 18a, the second open/close valve 18b, and the third open/close valve 18c.

Then, the air conditioning control device 60 closes the gas-phase side open/close valve 35 of the heating integrated valve 30a and opens the detour flow path side open/close valve 38. Similarly, in the cooling integrated valve 30b, the gas-phase side open/close valve 35 is closed, and the detour flow path side open/close valve 38 is opened.

As a result, in the series dehumidifying and heating mode, the refrigerant flows through the discharge port 11c of the compressor 11, the water refrigerant heat exchanger 12, the heating expansion valve 14a, the heating integrated valve 30a, the outdoor heat exchanger 17, and the first check valve 19a in that order. The refrigerant flowing out from the first check valve 19a flow through the first cooling expansion valve 14b, the cooling integrated valve 30b, the indoor evaporator 20, the evaporation pressure adjusting valve 21, the accumulator 22, and the suction port 11a of the compressor 11 in that order.

That is, in the series dehumidifying and heating mode, a refrigeration cycle is configured to circulate in a path in which the outdoor heat exchanger 17 and the indoor evaporator 20 are connected to each other in series with respect to the refrigerant flow. In the refrigeration cycle 10 in the series dehumidifying and heating mode, a refrigeration cycle is configured in which the water refrigerant heat exchanger 12 functions as a condenser and the indoor evaporator 20 functions as an evaporator.

In the series dehumidifying and heating mode, the gas-phase side open/close valve 35 is closed in both the heating integrated valve 30a and the cooling integrated valve 30b, and thus the gas-phase refrigerant separated by the gas-liquid separator 34 is not guided to the intermediate pressure port 11b of the compressor 11. That is, in the series dehumidifying and heating mode, the compressor 11 functions as a single-stage step-up compressor.

In the heating integrated valve 30a and the cooling integrated valve 30b in the series dehumidifying and heating mode, the detour flow path side open/close valve 38 is open, and thus the liquid-phase refrigerant flowing out from the gas-liquid separator 34 flows out from the second outflow port 33 substantially without being decompressed and without passing through the fixed throttle 36.

In the series dehumidifying and heating mode, the air conditioning control device 60 appropriately determines the control signals and the like to be output to the various controlled devices connected to the output side in this cycle configuration, and outputs the determined control signals and the like to the various controlled devices. For example, the air conditioning control device 60 determines the control signal so as to increase an opening degree ratio of the throttle opening degree of the first cooling expansion valve 14b to the throttle opening degree of the heating expansion valve 14a as the target blowout temperature TAO rises.

As a result, when a saturation temperature of the refrigerant in the outdoor heat exchanger 17 is higher than the outside air temperature Tam, a refrigeration cycle is configured in which the outdoor heat exchanger 17 functions as a condenser. When the saturation temperature of the refrigerant in the outdoor heat exchanger 17 is lower than the outside air temperature Tam, a refrigeration cycle is configured in which the outdoor heat exchanger 17 functions as an evaporator.

In the series dehumidifying and heating mode, when the saturation temperature of the refrigerant in the outdoor heat exchanger 17 is higher than the outside air temperature Tam, the saturation temperature of the refrigerant in the outdoor heat exchanger 17 decreases as the target blowout temperature TAO rises, and a heat dissipation amount of the refrigerant in the outdoor heat exchanger 17 can be reduced. As a result, the heat dissipation amount of the refrigerant in the water refrigerant heat exchanger 12 can be increased, and the heating capacity of the blown air in the heater core 42 can be improved.

In the series dehumidifying and heating mode, when the saturation temperature of the refrigerant in the outdoor heat exchanger 17 is lower than the outside air temperature Tam, the saturation temperature of the refrigerant in the outdoor heat exchanger 17 decreases as the target blowout temperature TAO rises, and a heat absorption amount of the refrigerant in the outdoor heat exchanger 17 can be increased. As a result, the heat dissipation amount of the refrigerant in the water refrigerant heat exchanger 12 can be increased, and the heating capacity of the blown air in the heater core 42 can be improved.

As a result, in the series dehumidifying and heating mode, the blown air cooled and dehumidified by the indoor evaporator 20 can be reheated by the heater core 42. Then, by blowing out the reheated blown air into the vehicle interior, the entire vehicle interior can be dehumidified and heated. Further, by adjusting the throttle opening degree of the heating expansion valve 14a and the first cooling expansion valve 14b, the heating capacity of the water refrigerant heat exchanger 12 (that is, the heating capacity of the blown air by the heater core 42) can be adjusted.

When the rear seat side of the vehicle interior is air-conditioned in the series dehumidifying and heating mode, the air conditioning control device 60 opens the third open/close valve 18c from the state in the series dehumidifying and heating mode and operates the rear seat blower 57. This makes it possible to implement air conditioning on the rear seat side of the vehicle interior in the series dehumidifying and heating mode.

Further, when the battery 48 is cooled in the series dehumidifying and heating mode, the air conditioning control device 60 sets the refrigerating expansion valve 14d in the throttled state from the state in the series dehumidifying and heating mode, and operates the low-temperature-side pump 46 with a pumping capacity determined in advance. Thus, the cooling of the battery 48 can be cooled in the series dehumidifying and heating mode by using the low-temperature-side heat medium cooled by the chiller 24.

(c) Parallel Dehumidifying and Heating Mode

In the parallel dehumidifying and heating mode, the air conditioning control device 60 sets the heating expansion valve 14a and the first cooling expansion valve 14b in the throttled state, and closes the refrigerating expansion valve 14d in the fully closed state. Further, the air conditioning control device 60 opens the first open/close valve 18a and the second open/close valve 18b, and closes the third open/close valve 18c.

Then, the air conditioning control device 60 closes the gas-phase side open/close valve 35 of the heating integrated valve 30a and opens the detour flow path side open/close valve 38. Similarly, in the cooling integrated valve 30b, the gas-phase side open/close valve 35 is closed, and the detour flow path side open/close valve 38 is opened.

As a result, in the parallel dehumidifying and heating mode, the refrigerant circulates through the discharge port 11c of the compressor 11, the water refrigerant heat exchanger 12, the heating expansion valve 14a, the heating integrated valve 30a, the outdoor heat exchanger 17, the second open/close valve 18b, the accumulator 22, and the suction port 11a of the compressor 11 in that order.

At the same time, the refrigerant circulates through the discharge port 11c of the compressor 11, the water refrigerant heat exchanger 12, the first open/close valve 18a, the first cooling expansion valve 14b, the cooling integrated valve 30b, the indoor evaporator 20, the evaporation pressure adjusting valve 21, the accumulator 22, and the suction port 11a of the compressor 11 in that order. That is, in the parallel dehumidifying and heating mode, a refrigeration cycle is configured to circulate in a path in which the outdoor heat exchanger 17 and the indoor evaporator 20 are connected to each other in parallel with the refrigerant flow. Then, in the refrigeration cycle 10 in the parallel dehumidifying and heating mode, a refrigeration cycle is configured in which the water refrigerant heat exchanger 12 functions as a condenser and the outdoor heat exchanger 17 and the indoor evaporator 20 function as evaporators.

In both the heating integrated valve 30a and the cooling integrated valve 30b in the parallel dehumidifying and heating mode, the gas-phase side open/close valve 35 is closed, and thus the gas-phase refrigerant separated by the gas-liquid separator 34 is not guided to the intermediate pressure port 11b of the compressor 11. That is, in the parallel dehumidifying and heating mode, the compressor 11 functions as a single-stage step-up compressor.

In the heating integrated valve 30a and the cooling integrated valve 30b in the parallel dehumidifying and heating mode, the detour flow path side open/close valve 38 is open, and thus the liquid-phase refrigerant flowing out from the gas-liquid separator 34 flows out from the second outflow port 33 substantially without being decompressed and without passing through the fixed throttle 36.

In the parallel dehumidifying and heating mode, the air conditioning control device 60 appropriately determines the control signals and the like to be output to the various controlled devices connected to the output side in this cycle configuration, and outputs the determined control signals and the like to the various controlled devices.

For example, the air conditioning control device 60 determines the control signal output to the heating expansion valve 14a and the first cooling expansion valve 14b such that COP approaches a maximum value on the basis of the high pressure Pd. At this time, the air conditioning control device 60 determines the control signal so as to increase the opening degree ratio of the throttle opening degree of the first cooling expansion valve 14b to the throttle opening degree of the heating expansion valve 14a as the target blowout temperature TAO rises.

As a result, in the parallel dehumidifying and heating mode, the blown air cooled and dehumidified by the indoor evaporator 20 can be reheated by the heater core 42. Then, by blowing out the reheated blown air into the vehicle interior, the entire vehicle interior can be dehumidified and heated. Further, by adjusting the throttle opening degrees of the heating expansion valve 14a and the first cooling expansion valve 14b, the heat dissipation amount of the water refrigerant heat exchanger 12 can be adjusted, and the heating capacity of the heater core 42 can be adjusted.

In the parallel dehumidifying and heating mode, a refrigerant evaporation temperature in the outdoor heat exchanger 17 can be made lower than the refrigerant evaporation temperature in the indoor evaporator 20. Therefore, in the parallel dehumidifying and heating mode, the heat absorption amount of the refrigerant in the outdoor heat exchanger 17 can be increased as compared with the series dehumidifying and heating mode, and the heating capacity of the blown air can be increased.

When the rear seat side of the vehicle interior is air-conditioned in the parallel dehumidifying and heating mode, the air conditioning control device 60 opens the third open/close valve 18c from the state in the parallel dehumidifying and heating mode and operates the rear seat blower 57. This makes it possible to implement air conditioning on the rear seat side of the vehicle interior in the parallel dehumidifying and heating mode.

Further, when the battery 48 is cooled in the parallel dehumidifying and heating mode, the air conditioning control device 60 sets the refrigerating expansion valve 14d in the throttled state from the state in the parallel dehumidifying and heating mode, and operates the low-temperature-side pump 46 with a pumping capacity determined in advance. Thus, the cooling of the battery 48 can be cooled in the parallel dehumidifying and heating mode by using the low-temperature-side heat medium cooled by the chiller 24.

(d) Heating Mode

In the heating mode, the air conditioning control device 60 sets the heating expansion valve 14a in the throttled state, and sets the first cooling expansion valve 14b and the refrigerating expansion valve 14d in the fully closed state. The air conditioning control device 60 closes the first open/close valve 18a and the third open/close valve 18c, and opens the second open/close valve 18b. Then, the air conditioning control device 60 opens the gas-phase side open/close valve 35 of the heating integrated valve 30a and closes the detour flow path side open/close valve 38.

As a result, in the heating mode, the refrigerant circulates through the discharge port 11c of the compressor 11, the water refrigerant heat exchanger 12, the heating expansion valve 14a, the heating integrated valve 30a, the outdoor heat exchanger 17, the second open/close valve 18b, the accumulator 22, and the suction port 11a of the compressor 11 in that order. Therefore, in the refrigeration cycle 10 in the heating mode, a gas injection cycle is configured in which the water refrigerant heat exchanger 12 functions as a radiator and the outdoor heat exchanger 17 functions as an evaporator.

Here, in the heating integrated valve 30a in the heating mode, the gas-phase side open/close valve 35 is open, and thus the gas-phase refrigerant separated by the gas-liquid separator 34 is guided to the intermediate pressure port 11b of the compressor 11. That is, in the heating mode, the compressor 11 functions as a two-stage step-up compressor, and a so-called gas injection cycle is configured.

Since the detour flow path side open/close valve 38 is closed in the heating integrated valve 30a in the heating mode, the liquid-phase refrigerant flowing out from the gas-liquid separator 34 passes through the fixed throttle 36 and is decompressed.

In this cycle configuration, the air conditioning control device 60 appropriately determines the control signals and the like to be output to the various controlled devices connected to the output side, and outputs the determined control signals and the like to the various controlled devices. As a result, in the heating mode, the entire vehicle interior can be heated by blowing out the blown air heated by the heat radiated by the water refrigerant heat exchanger 12 into the vehicle interior.

When the battery 48 is cooled in the heating mode, the air conditioning control device 60 opens the first open/close valve 18a and sets the refrigerating expansion valve 14d in the throttled state from the state in the heating mode. Further, the air conditioning control device 60 operates the low-temperature-side pump 46 with a predetermined pumping capacity.

As a result, at the same time as the circulation of the refrigerant in the heating mode, the refrigerant circulates through the discharge port 11c of the compressor 11, the water refrigerant heat exchanger 12, the first open/close valve 18a, the refrigerating expansion valve 14d, the chiller 24, the accumulator 22, and the suction port 11a of the compressor 11 in that order. That is, a refrigeration cycle is configured to circulate in a path in which the outdoor heat exchanger 17 and the chiller 24 are connected to each other in parallel with the refrigerant flow.

As a result, the refrigerant flowing out from the first open/close valve 18a is decompressed by the refrigerating expansion valve 14d and flows into the refrigerant passage of the chiller 24. The low-pressure refrigerant flowing into the chiller 24 exchanges heat with the low-temperature-side heat medium circulating in the water passage to cool the low-temperature-side heat medium. Then, the low-temperature-side heat medium flowing out from the chiller 24 exchanges heat with each battery cell of the battery 48 in the battery cooler 47 to cool the battery 48. Thus, the battery 48 can be cooled in the heating mode.

As described above, in the vehicle air conditioner 1 according to the first embodiment, operations in various operation modes can be performed by switching the refrigerant circuit to air-condition the entire vehicle interior. As a result, the vehicle air conditioner 1 can implement comfortable air conditioning of the entire vehicle interior. In addition to the air conditioning of the entire vehicle interior, comfortable air conditioning on the rear seat side of vehicle interior is implemented in the vehicle air conditioner 1 by switching presence or absence of the low-pressure refrigerant flowing to the rear seat evaporator 23.

Further, in addition to air conditioning of the entire vehicle interior, the temperature of the battery 48 can be controlled appropriately by switching presence or absence of the low-pressure refrigerant flowing to the chiller 24 in the vehicle air conditioner 1.

Subsequently, a specific configuration of the connection module 80 according to the first embodiment will be described with reference to FIG. 6 and the like. As described above, the body 81 of the connection module 80 includes metal, has a flat plate shape, and includes the refrigerant flow path 82 inside thereof. Further, the first to eleventh connection ports 83a to 83k and the first to fifth attachment portions 84a to 84e are connected to the refrigerant flow path 82 inside the body 81.

Therefore, the body 81 can be formed as follows. First, a core having a shape of the refrigerant flow path 82 or the like to which the first to eleventh connection ports 83a to 83k and the first to fifth attachment portions 84a to 84e are connected is formed by using salt or the like. A core formed with salt or the like is disposed at a predetermined position on a mold having a flat plate shape.

After that, a molten metal is injected into the mold in which the core is disposed to cast the body 81. By melting and removing the core formed with salt or the like at a stage where the molten metal is solidified, the refrigerant flow path 82, the first to eleventh connection ports 83a to 83k, the first to fifth attachment portions 84e to 84a are formed inside the body 81.

As shown in FIGS. 1 and 2, the water refrigerant heat exchanger 12, the accumulator 22, the chiller 24, the heating integrated valve 30a, and the cooling integrated valve 30b are attached to the body 81 having a flat plate shape configured in this way.

Further, the first to third attachment portions 84a to 84c are formed on an upper surface of the body 81. By using these attachment portions, the heating expansion valve 14a, the first cooling expansion valve 14b, and the refrigerating expansion valve 14d, which are fluid control devices, are attached to the body 81.

Further, the fourth attachment portion 84d is formed on a lower surface of the body 81, and the fifth attachment portion 84e is formed below a left side surface of the body 81. The first open/close valve 18a as a fluid control device is attached to the body 81 by using the fourth attachment portion 84d, and the third open/close valve 18c as a fluid control device is attached to the body 81 by using the fifth attachment portion 84e.

Here, as shown in FIGS. 1 and 2, the heater core 42 is attached to a front surface of the body 81 of the connection module 80. Therefore, as shown in FIG. 6, the first connection port 83a connected to an outflow port of the heater core 42 connects the refrigerant flow path 82 inside the body 81 and the outside of the body 81 at a lower front surface of the body 81 to each other. The refrigerant flow path 82 extending from the first connection port 83a is connected to a lower surface of the first attachment portion 84a.

The first attachment portion 84a has a recessed shape in which the upper surface of the body 81 is recessed downward. The first attachment portion 84a has an internal space along a contour of the heating expansion valve 14a. Thus, the heating expansion valve 14a can be attached to the first attachment portion 84a.

A left side surface of the first attachment portion 84a is connected to the refrigerant flow path 82 extending toward the second connection port 83b. That is, the first attachment portion 84a is formed so as to enter the refrigerant flow path 82 connecting the first connection port 83a and the second connection port 83b to each other. Therefore, by attaching the heating expansion valve 14a to the first attachment portion 84a, the heating expansion valve 14a can be disposed on a midway of the refrigerant flow path 82 connecting the first connection port 83a and the second connection port 83b to each other.

Figure 6:
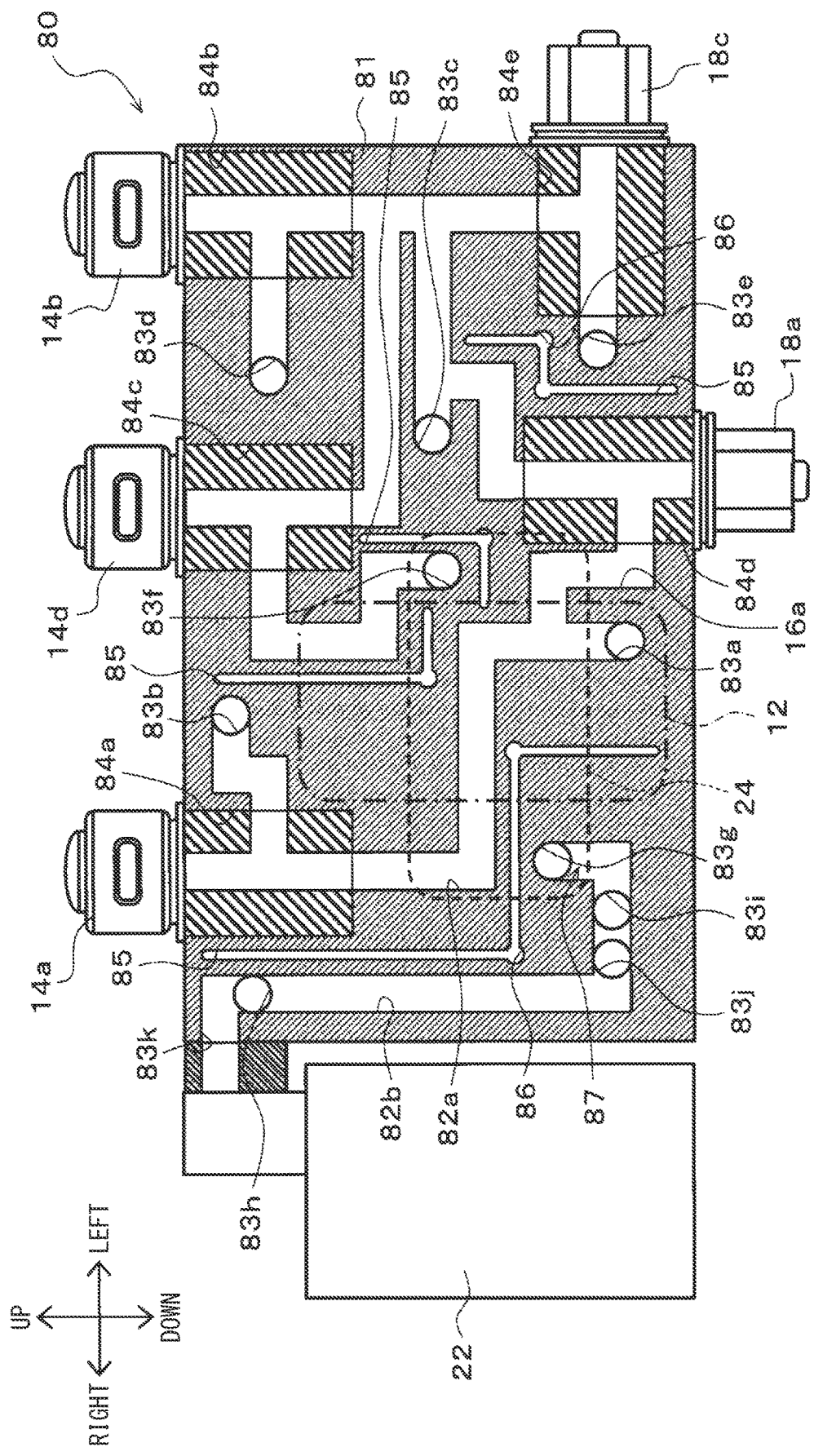
FIG. 6 is an explanatory diagram showing an internal configuration of the connection module according to the first embodiment.

As shown in FIG. 6, the fourth attachment portion 84d with an open bottom is formed on the left side of the first connection port 83a. The refrigerant flow path 82 that branches on a midway of the refrigerant flow path 82 connecting the first connection port 83a and the lower surface of the first attachment portion 84a to each other is connected to a right side surface of the fourth attachment portion 84d.

The fourth attachment portion 84d has a recessed shape in which the lower surface of the body 81 is recessed upward. The fourth attachment portion 84d has an internal space along a contour of the first open/close valve 18a. Thus, the first open/close valve 18a can be attached to the fourth attachment portion 84d. The refrigerant flow path 82 extending toward the third connection port 83c is connected to an upper surface of the fourth attachment portion 84d.

The refrigerant flow path 82 that branches on a midway of the refrigerant flow path 82 connecting the first connection port 83a and the lower surface of the first attachment portion 84a to each other and extends to the third connection port 83c via the fourth attachment portion 84d corresponds to the bypass flow path 16a.

The refrigerant flow path 82 that branches between the upper surface of the fourth attachment portion 84d and the third connection port 83c is branched into three refrigerant flow paths 82. One of the three refrigerant flow paths 82 is connected to an upper surface of the fifth attachment portion 84e formed on the left side surface of the body 81. Another one of the three refrigerant flow paths 82 is connected to a lower surface of the second attachment portion 84b formed on the upper surface of the body 81. The remaining one of the three refrigerant flow paths 82 is connected to a lower surface of the third attachment portion 84c formed on the upper surface of the body 81.

The fifth attachment portion 84e has a recessed shape in which the left side surface of the body 81 is recessed to the right. The fifth attachment portion 84e has an internal space along a contour of the third open/close valve 18c. Thus, the third open/close valve 18c can be attached to the fifth attachment portion 84e. The refrigerant flow path 82 extending toward the fifth connection port 83e is connected to a right side surface of the fifth attachment portion 84e.

The second attachment portion 84b has a recessed shape whose upper surface is recessed downward on the left side of the upper surface of the body 81. The second attachment portion 84b has an internal space along a contour of the first cooling expansion valve 14b. Thus, the first cooling expansion valve 14b can be attached to the second attachment portion 84b. The refrigerant flow path 82 extending toward the fourth connection port 83d is connected to a right side surface of the second attachment portion 84b.

Then, the third attachment portion 84c has a recessed shape whose upper surface is recessed downward between the second attachment portion 84b and the first attachment portion 84a on the upper surface of the body 81. The third attachment portion 84c has an internal space along a contour of the refrigerating expansion valve 14d. Thus, the refrigerating expansion valve 14d can be attached to the third attachment portion 84c. Then, the refrigerant flow path 82 extending toward the sixth connection port 83f is connected to a right side surface of the third attachment portion 84c.

Here, as shown in FIGS. 1 and 2, in the connection module 80 according to the first embodiment, the chiller 24 is attached to a rear surface of the body 81. As described above, the sixth connection port 83*f* is an inlet side connection port connected to an inflow port of the chiller 24. Therefore, the sixth connection port 83*f* connects the refrigerant flow path 82 inside the body 81 and the outside of the body 81 to each other on the rear surface of the body 81.

Then, as shown in FIG. 6, the seventh connection port 83*g* is disposed on a lower right side of the sixth connection port 83*f*. The seventh connection port 83*g* is an outlet side connection port to which an outflow port of the chiller 24 is connected. Therefore, the seventh connection port 83*g* connects the refrigerant flow path 82 inside the body 81 and the outside of the body 81 on the rear surface of the body 81. That is, the seventh connection port 83*g* as the outlet side connection port to the chiller 24 is disposed below the sixth connection port 83*f* as the inlet side connection port in a gravitational direction of the body 81.

The refrigerant flow path 82 extending from the seventh connection port 83*g* extends downward in the gravitational direction of the body 81, changes the extension direction by 180 degrees, and extends upward toward the eleventh connection port 83*k*.

The eleventh connection port 83*k* is formed in an upper part on a right side surface of the body 81. The inlet side of the accumulator 22 attached along the right side surface of the body 81 is connected to the eleventh connection port 83*k*.

The ninth connection port 83*i* and the tenth connection port 83*j* are disposed in the refrigerant flow path 82 extending from the seventh connection port 83*g* to the eleventh connection port 83*k*. The ninth connection port 83*i* is connected to an outflow port side of the indoor evaporator 20. The tenth connection port 83*j* is connected to an outflow port side of the outdoor heat exchanger 17 via the heating flow path 16*b*. Therefore, the ninth connection port 83*i* and the tenth connection port 83*j* correspond to main connection ports connected to an outflow port of the main evaporator.

As shown in FIG. 6, in the refrigerant flow path 82 extending from the seventh connection port 83*g* to the eleventh connection port 83*k*, the ninth connection port 83*i* and the tenth connection port 83*j* are disposed at lowest positions in the gravitational direction. In other words, the ninth connection port 83*i* and the tenth connection port 83*j* are disposed below the seventh connection port 83*g*.

Further, the eighth connection port 83*h* is disposed in the refrigerant flow path 82 extending from the seventh connection port 83*g* to the eleventh connection port 83*k*. The eighth connection port 83*h* is an auxiliary connection port to which an outflow port side of the rear seat evaporator 23 is connected via a refrigerant pipe. As shown in FIG. 6, the eighth connection port 83*h* is disposed downstream of the ninth connection port 83*i* and the tenth connection port 83*j* in the flow of the refrigerant from the seventh connection port 83*g* to the eleventh connection port 83*k*.

The second to fifth connection ports 83*b* to 83*e* and the eighth to tenth connection ports 83*j* to 83*h* are opened toward either the front surface or the rear surface of the body 81. A direction in which these connection ports are opened can be appropriately changed in accordance with the configuration of the refrigeration cycle 10 and a vehicle layout.

Here, in the refrigerant flow path 82 of the connection module 80 according to the first embodiment, the refrigerant flow path 82 through which the high-pressure refrigerant of the refrigeration cycle 10 flows coexists with the refrigerant flow path 82 through which a refrigerant having a lower temperature than the high-pressure refrigerant (for example, low-pressure refrigerant or intermediate-pressure refrigerant) flows.

In the following description, the refrigerant flow path 82 through which the high-pressure refrigerant of the refrigeration cycle 10 flows is referred to as a high-temperature-side flow path 82*a*, and the refrigerant flow path 82 through which the low-pressure refrigerant or intermediate-pressure refrigerant of the refrigeration cycle 10 flows is referred to as a low-temperature-side flow path 82*b*.

Further, with the switching of the operation mode of the vehicle air conditioner 1, the high-temperature-side flow path 82*a* and the low-temperature-side flow path 82*b* in the refrigerant flow path 82 of the connection module 80 are appropriately changed. It is therefore conceivable that the high-temperature-side flow path 82*a* and the low-temperature-side flow path 82*b* are adjacent to each other inside the body 81 of the connection module 80.

In this case, heat may be transferred through the body 81 between the high-pressure refrigerant flowing through the high-temperature-side flow path 82*a* and the low-pressure refrigerant flowing through the low-temperature-side flow path 82*b*, which may affect each other. In particular, there is a concern that a coefficient of performance of the refrigeration cycle 10 may decrease due to an influence of the heat between the high-temperature-side flow path 82*a* and the low-temperature-side flow path 82*b*.

In view of this point, as shown in FIG. 6, a plurality of heat transfer inhibiting portions 85 are formed in the body 81 of the connection module 80 according to the first embodiment. Each of the heat transfer inhibiting portions 85 is disposed between the high-temperature-side flow path 82*a* and the low-temperature-side flow path 82*b*, and is formed so as to have lower thermal conductivity than the body 81.

Specifically, each of the heat transfer inhibiting portions 85 according to the first embodiment has a groove shape extending along either the high-temperature-side flow path 82*a* or the low-temperature-side flow path 82*b* between the high-temperature-side flow path 82*a* and the low-temperature-side flow path 82*b*. Since a space in which air exists is formed inside each heat transfer inhibiting portion 85 having a groove shape, each heat transfer inhibiting portion 85 can have lower thermal conductivity than the body 81.

As shown in FIG. 6, the heat transfer inhibiting portion 85 is disposed between the refrigerant flow path 82 connecting the seventh connection port 83*g* and the eleventh connection port 83*k* and the refrigerant flow path 82 connecting the first connection port 83*a* and the lower surface of the first attachment portion 84*a*.

Here, the refrigerant flow path 82 connecting the first connection port 83*a* and the lower surface of the first attachment portion 84*a* is the refrigerant flow path 82 through which the high-pressure refrigerant flowing out from the water refrigerant heat exchanger 12 is circulated as described in each operation mode of the vehicle air conditioner 1, and thus corresponds to the high-temperature-side flow path 82*a*.

On the other hand, the refrigerant flow path 82 connecting the seventh connection port 83*g* and the eleventh connection port 83*k* is the refrigerant flow path 82 through which the low-pressure refrigerant flowing out from the indoor evaporator 20, the chiller 24, or the like flows, and corresponds to the low-temperature-side flow path 82*b*.

Therefore, the heat transfer inhibiting portion 85 can suppress the transfer of heat via the body 81 between the high-pressure refrigerant flowing from the water refrigerant heat exchanger 12 to the heating expansion valve 14*a* and the low-pressure refrigerant flowing from the chiller 24 or the indoor evaporator 20 to the accumulator 22.

Further, as shown in FIG. 6, the heat transfer inhibiting portion 85 is also disposed between the refrigerant flow path 82 extending from the first connection port 83a to the first attachment portion 84a and the refrigerant flow path 82 extending from the third attachment portion 84c to the sixth connection port 83f.

When the battery 48 is cooled in the heating mode, the refrigerant flow path 82 extending from the first connection port 83a to the first attachment portion 84a is the refrigerant flow path 82 through which the high-pressure refrigerant flowing out from the water refrigerant heat exchanger 12 flows, and corresponds to the high-temperature-side flow path 82a.

When the battery 48 is cooled in the heating mode, the refrigerant flow path 82 extending from the fourth attachment portion 84d to the sixth connection port 83f is a refrigerant flow path through which the low-pressure refrigerant decompressed by the refrigerating expansion valve 14d flows. Thus, this refrigerant flow path 82 corresponds to the low-temperature-side flow path 82b.

Therefore, the heat transfer inhibiting portion 85 can suppress the transfer of heat via the body 81 between the high-pressure refrigerant flowing from the water refrigerant heat exchanger 12 to the heating expansion valve 14a and the low-pressure refrigerant flowing from the refrigerating expansion valve 14d to the chiller 24.

As described above, by arranging the heat transfer inhibiting portion 85 between the high-temperature-side flow path 82a and the low-temperature-side flow path 82b, the connection module 80 can suppress the influence of heat on the refrigerant flowing through each of the high-temperature-side flow path 82a and the low-temperature-side flow path 82b.

A deformation absorber 86 is formed in each of the heat transfer inhibiting portions 85 in the connection module 80. As described above, the heat transfer inhibiting portion 85 is disposed between the high-temperature-side flow path 82a and the low-temperature-side flow path 82b.

Therefore, the body 81 located on a side of the high-temperature-side flow path 82a with respect to the heat transfer inhibiting portion 85 thermally expands due to the heat of the high-pressure refrigerant flowing through the high-temperature-side flow path 82a. On the other hand, the body 81 located on a side of the low-temperature-side flow path 82b with respect to the heat transfer inhibiting portion 85 shrinks due to the low-pressure refrigerant flowing through the low-temperature-side flow path 82b.

As described above, since an aspect of the deformation of the body 81 is different between the side of the high-temperature-side flow path 82a and the side of the low-temperature-side flow path 82b with respect to the heat transfer inhibiting portion 85, a stress caused by the deformation of the body 81 may concentrate on the heat transfer inhibiting portion 85.

In view of this point, in the connection module 80 according to the first embodiment, the deformation absorber 86 is formed for each heat transfer inhibiting portion 85. The deformation absorber 86 is formed so as to communicate with an internal space of the heat transfer inhibiting portion 85 having a groove shape, and is disposed at a corner of the heat transfer inhibiting portion 85.

The deformation absorber 86 has a columnar internal space, absorbs the deformation of the body 81 on the side of the high-temperature-side flow path 82a and the deformation of the body 81 on the side of the low-temperature-side flow path 82b, and relaxes a stress concentration due to the deformation.

Here, the refrigerant circulating in the refrigeration cycle 10 in the first embodiment includes compatible refrigerating machine oil, and when the refrigerant evaporates in an evaporator of the chiller 24 or the like, the refrigerating machine oil may accumulate below the inside of a heat exchanger of the chiller 24 or the like.

When the refrigerating machine oil accumulates in the evaporator of the chiller 24 or the like in the refrigeration cycle 10, a sufficient amount of the refrigerating machine oil does not return to the compressor 11, which may cause seizure of the compressor 11.

In view of this point, in the connection module 80 according to the first embodiment, as shown in FIG. 6, the seventh connection port 83g connected to the outflow port of the chiller 24 is located below the sixth connection port 83f connected to the inflow port 31 of the chiller 24 in the gravitational direction.

As a result, even when the refrigerating machine oil accumulates in a lower part of the chiller 24 due to the evaporation of the refrigerant in the chiller 24, the refrigerating machine oil can flow out to the refrigerant flow path 82 of the connection module 80 through the outflow port of the chiller 24 and the seventh connection port 83g. That is, the connection module 80 can contribute to securing the amount of the refrigerating machine oil returning to the compressor 11.

Further, as shown in FIG. 6, the refrigerant flow path 82 extending from the seventh connection port 83g to the eleventh connection port 83k extends downward from the seventh connection port 83g, then changes the extending direction upward, and is connected to the eleventh connection port 83k.

The ninth connection port 83i and the tenth connection port 83j are disposed in the refrigerant flow path 82 extending from the seventh connection port 83g to the eleventh connection port 83k. The ninth connection port 83i and the tenth connection port 83j are disposed below the seventh connection port 83g in the gravitational direction and at a lowest position in the refrigerant flow path 82 extending from the seventh connection port 83g.

Here, as shown in FIG. 3, the ninth connection port 83i is a connection port to which the outflow port of the indoor evaporator 20 is connected via a refrigerant pipe. The tenth connection port 83j is a connection port to which the outflow port of the outdoor heat exchanger 17 is connected via the heating flow path 16b. The indoor evaporator 20 and the outdoor heat exchanger 17 in the heating mode and the like have a higher refrigerant flow rate than the refrigerant flow rate of the chiller 24 when the battery 48 is cooled. The outdoor heat exchanger 17 in this case corresponds to the main evaporator.

As shown in FIG. 6, in the refrigerant flow path 82 extending from the seventh connection port 83g to the eleventh connection port 83k, the refrigerant flow path 82 extending downward in the gravitational direction is disposed between the seventh connection port 83g and the ninth and tenth connection ports 83i and 83j.

That is, the refrigerant flow path 82 extending downward from the seventh connection port 83g in the gravitational direction corresponds to an inhibiting portion 87 that restricts the refrigerant from the ninth connection port 83i and the tenth connection port 83j from flowing into the seventh connection port 83g.

As a result, even when the refrigerating machine oil flowing out from the seventh connection port 83g accumulates in a lower part of the refrigerant flow path 82 extending from the seventh connection port 83g, the refrigerating machine oil can flow to the eleventh connection port 83k using a flow of the refrigerant joining from the ninth connection port 83i and the tenth connection port 83j. That is, in this respect, the connection module 80 can also contribute to securing the amount of the refrigerating machine oil returning to the compressor 11.

Further, as shown in FIG. 6, in the refrigerant flow path 82 extending from the seventh connection port 83g to the eleventh connection port 83k, the eighth connection port 83h is located downstream of the ninth connection port 83i and the tenth connection port 83j in the refrigerant flow.

Here, the eighth connection port 83h is a connection port to which the outflow port of the rear seat evaporator 23 is connected via a refrigerant pipe. The rear seat evaporator 23 corresponds to a main evaporator through which the low-pressure refrigerant flows when the low-pressure refrigerant flows through at least the indoor evaporator 20.

Thus, when the refrigerating machine oil from the rear seat evaporator 23 flows out to the refrigerant flow path 82 through the eighth connection port 83h, the refrigerating machine oil joins the low-pressure refrigerant flowing out from the ninth connection port 83i and flows at least from the indoor evaporator 20. The low-pressure refrigerant flowing out from the ninth connection port 83i has a higher flow rate because the low-pressure refrigerant passes through the indoor evaporator 20.

Therefore, even when the refrigerating machine oil flows out from the rear seat evaporator 23 through the eighth connection port 83h, the refrigerating machine oil can flow to the eleventh connection port 83k using the flow of the refrigerant having a higher flow rate and flowing out from the ninth connection port 83i and the tenth connection port 83j. As a result, the connection module 80 can contribute to securing the amount of the refrigerating machine oil returning to the compressor 11.

Subsequently, a configuration of a bent portion 82c in the refrigerant flow path 82 of the connection module 80 will be described with reference to FIG. 7. The refrigerant flow path 82 in the connection module 80 includes a plurality of bent portions 82c. Therefore, in the refrigerant flow path 82 of the connection module 80, it is important to reduce a pressure loss at each of the bent portions 82c as much as possible.

The bent portions 82c of the refrigerant flow path 82 in the connection module 80 according to the first embodiment are formed to have a smaller pressure loss at the bent portions 82c than when the bent portions 82c are configured by a refrigerant pipe.

Figure 7:
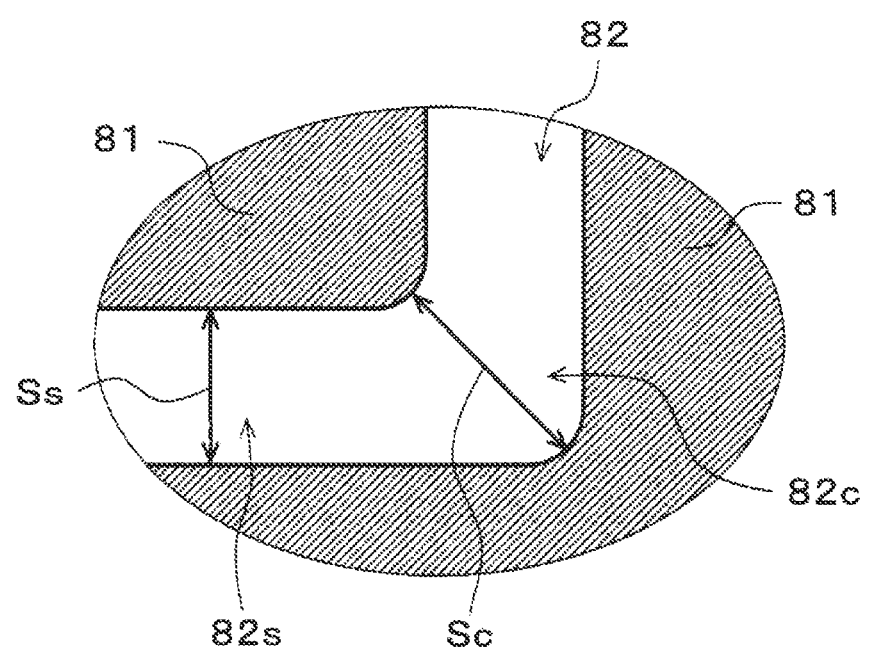
FIG. 7 is an enlarged view of a bent portion in a refrigerant flow path of the connection module according to the first embodiment.

Specifically, as shown in FIG. 7, the bent portion 82c is formed such that a flow path cross-sectional area Sc of the bent portion 82c is larger than a flow path cross-sectional area Ss of a straight portion 82s extending linearly in the refrigerant flow path 82.

As a result, the pressure loss at the bent portion 82c of the refrigerant flow path 82 is smaller than the pressure loss in a case where the bent portion has the same flow path cross-sectional area as the straight portion, as in a case where the bent portion is configured in the refrigerant pipe.

Such a configuration cannot be achieved when each component is connected by a refrigerant pipe as in a conventional refrigeration cycle device. This is because when the bent portion is configured in the refrigerant pipe, the flow path cross-sectional area of the bent portion is the same as the flow path cross-sectional area of the straight portion of the refrigerant pipe. Since the body 81 of the connection module 80 according to the first embodiment is formed by casting, each bent portion 82c in the refrigerant flow path 82 can be configured as shown in FIG. 7.

As described above, the connection module 80 according to the first embodiment has, inside the body 81, the refrigerant flow path 82 including the high-temperature-side flow path 82a having a connection port connected to the high-temperature-side component and the low-temperature-side flow path 82b having a connection port connected to the low-temperature-side component.

Thus, a configuration on a high-temperature-side in the refrigeration cycle 10 can be changed by changing the connection port of the high-temperature-side flow path 82a. Further, by changing the connection port of the low-temperature-side flow path, a configuration on a low-temperature-side in the refrigeration cycle 10 can be changed. That is, by using the connection module 80, it is possible to support various configurations of the refrigeration cycle 10.

As shown in FIGS. 3 and 6, inside the body 81 of the connection module 80, it is possible to form the flow of the refrigerant to the high-temperature-side component via the high-temperature-side flow path 82a and the flow of the refrigerant to the low-temperature-side component via the low-temperature-side flow path 82b. As a result, many parts of the flow of the refrigerant in the refrigeration cycle 10 as a whole can be aggregated inside the connection module 80, which can contribute to space saving in the refrigeration cycle 10.

The heat transfer inhibiting portion 85 is formed between the high-temperature-side flow path 82a and the low-temperature-side flow path 82b in the body 81 of the connection module 80. Thus, the influence of heat on the high-pressure refrigerant flowing through the high-temperature-side flow path 82a and the low-pressure refrigerant flowing through the low-temperature-side flow path 82b can be suppressed, and the decrease in the coefficient of performance of the refrigeration cycle 10 can be suppressed.

As shown in FIG. 6, each heat transfer inhibiting portion 85 is provided with the deformation absorber 86. Each deformation absorber 86 can absorb the deformation of the body 81 located on the side of the high-temperature-side flow path 82a with respect to the heat transfer inhibiting portion 85 and the deformation of the body 81 located on the side of the low-temperature-side flow path 82b with respect to the heat transfer inhibiting portion 85, and thus can relax the stress concentration in the body 81.

Then, as shown in FIG. 6, in the body 81 of the connection module 80, the seventh connection port 83g connected to the outflow port of the chiller 24 as an evaporator is located below the sixth connection port 83f connected to the inflow port of the chiller 24 in the gravitational direction.

As a result, as the refrigerant in the chiller 24 evaporates, the refrigerating machine oil that has accumulated in the lower part of the chiller 24 flows out from the seventh connection port 83g to the refrigerant flow path 82 of the connection module 80, which can contribute to securing the amount of the refrigerating machine oil returning to the compressor 11.

Further, as shown in FIG. 6, in the refrigerant flow path 82 extending from the seventh connection port 83g, the ninth connection port 83i connected to the outflow port of the indoor evaporator 20 and the tenth connection port 83j connected to the outflow port of the outdoor heat exchanger 17 are located below the seventh connection port 83g in the gravitational direction.

Thus, the refrigerating machine oil that has flowed out from the seventh connection port 83g and has accumulated in the lower part of the refrigerant flow path 82 can flow to the eleventh connection port 83k by using the flow of the refrigerant having a large flow rate and flowing from the ninth connection port 83i and the tenth connection port 83j. As a result, the connection module 80 can contribute to securing the amount of the refrigerating machine oil returning to the compressor 11.

As shown in FIG. 3, the vehicle air conditioner 1 has the rear seat evaporator 23, and the rear seat evaporator 23 is used such that a low-pressure refrigerant flows when the low-pressure refrigerant flows through at least the indoor evaporator 20.

Then, as shown in FIG. 6, in the refrigerant flow path 82 extending from the seventh connection port 83g to the eleventh connection port 83k, the eighth connection port 83h connected to the outflow port of the rear seat evaporator 23 is disposed downstream of the ninth connection port 83i and the tenth connection port 83j in the refrigerant flow.

Therefore, even when the refrigerating machine oil from the rear seat evaporator 23 flows out through the eighth connection port 83h, the refrigerating machine oil can reliably flow to the eleventh connection port 83k by using the flow of the refrigerant having a large flow rate flows out from the indoor evaporator 20 through the ninth connection port 83i. That is, in this respect, the connection module 80 can also contribute to securing the amount of the refrigerating machine oil returning to the compressor 11.

Further, as shown in FIG. 6, the first to fifth attachment portions 84a to 84e are formed in the body 81 of the connection module 80. The heating expansion valve 14a, the first cooling expansion valve 14b, the refrigerating expansion valve 14d, the first open/close valve 18a, and the third open/close valve 18c are attached to the first to fifth attachment portions 84a to 84e, respectively.

Thus, spaces for arranging the heating expansion valve 14a, the first open/close valve 18a, and the like can be aggregated in the first attachment portion 84a to the fifth attachment portion 84e in the body 81, which can contribute to space saving in the refrigeration cycle 10.

As shown in FIG. 7, the bent portion 82c of the refrigerant flow path 82 in the connection module 80 is formed such that the flow path cross-sectional area Sc of the bent portion 82c is larger than the flow path cross-sectional area Ss of the straight portion 82s of the refrigerant flow path 82. As a result, in the connection module 80, the pressure loss at the bent portion 82c of the refrigerant flow path 82 can be reduced. As shown in FIG. 6, the refrigerant flow path 82 of the connection module 80 includes multiple bent portions 82c, and thus the pressure loss can be effectively reduced.

Second Embodiment

Next, the connection module 80 according to a second embodiment will be described. In the connection module 80 according to the second embodiment, a connection method of the water refrigerant heat exchanger 12 and the chiller 24 to the body 81 is changed from the first embodiment. Since other configurations are similar to those of the first embodiment described above, the description thereof will be omitted.

In the connection module 80 according to the second embodiment, the heater core 42 is attached to the front surface of the body 81 as in the first embodiment. The outflow port of the heater core 42 is connected to the first connection port 83a formed on the front surface of the body 81 with fasteners such as bolts and nuts.

By using the fasteners, the heater core 42 has a fixed relative positional relationship with the body 81 while being in contact with the front surface of the body 81. That is, in the connection module 80 according to the second embodiment, the water refrigerant heat exchanger 12, which is a high-temperature-side component and an example of a heat medium refrigerant heat exchanger, is integrated with the body 81.

In the connection module 80 according to the second embodiment, the chiller 24 is attached to the rear surface of the body 81 as in the first embodiment. As described above, the chiller 24 is a low-temperature-side component and corresponds to an example of an evaporator that absorbs heat by evaporating a refrigerant.

The refrigerant inlet of the chiller 24 is connected to the sixth connection port 83f formed on the rear surface of the body 81 with fasteners such as bolts and nuts. The refrigerant outlet of the chiller 24 is connected to the seventh connection port 83g formed on the rear surface of the body 81 with fasteners such as bolts and nuts.

By connecting the chiller 24 with fasteners at the sixth connection port 83f and the seventh connection port 83g of the body 81, the chiller 24 has a fixed relative positional relationship with the body 81 while being in contact with the rear surface of the body 81. That is, the chiller 24 is integrated with the body 81 in the connection module 80 according to the second embodiment.

By integrating the water refrigerant heat exchanger 12 with the body 81, the connection module 80 can save space in terms of the arrangement of the high-temperature-side components in the refrigeration cycle 10. Further, by integrating the chiller 24 with the body 81, the connection module 80 can save space in terms of the arrangement of the low-temperature-side components in the refrigeration cycle 10.

As described above, in the connection module 80 according to the second embodiment, it is possible to obtain the effects obtained from the configuration and operation common to those of the first embodiment in a similar manner as in the first embodiment.

Since the water refrigerant heat exchanger 12 is integrated with the body 81, the connection module 80 according to the second embodiment can save space in terms of the arrangement of the high-temperature-side components in the refrigeration cycle 10. Further, since the chiller 24 is integrated with the body 81, the connection module 80 can save space for the arrangement of the low-temperature-side components in the refrigeration cycle 10.

In the present disclosure, the integration of the component with the body 81 means that the refrigerant inlet or the refrigerant outlet of the component is connected to a connection port (for example, the first connection port 83a) of the body 81, and the component and the body 81 have a fixed relative positional relationship to be in contact with each other. Fasteners such as bolts and nuts have been used to connect the connection port of the body 81 to the refrigerant inlet or the refrigerant outlet of the component, but an aspect of joining by welding or the like may be adopted. As a method of fixing a relative position between the component and the body 81, the component may be fixed to the body.

Third Embodiment

Figure 8:
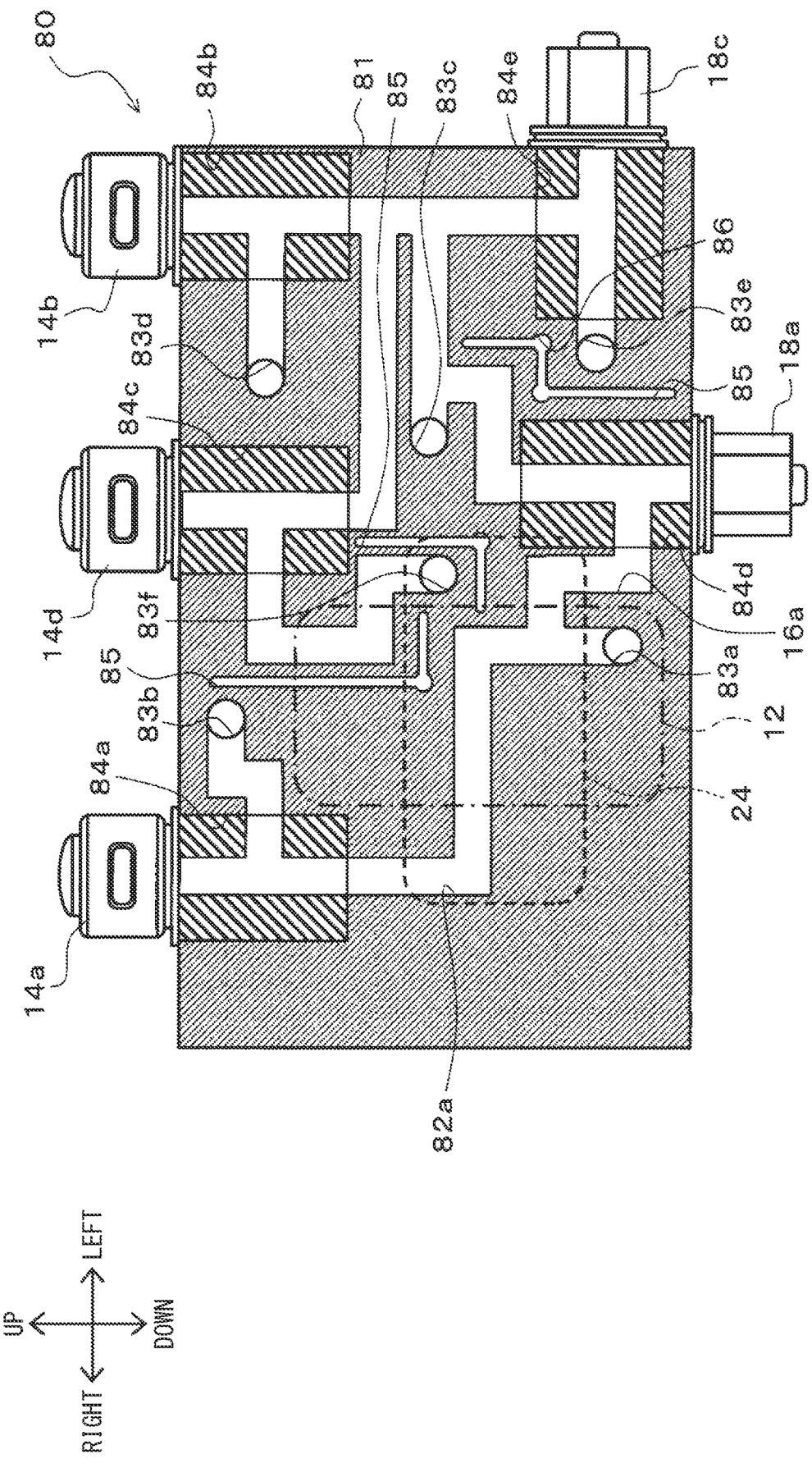
FIG. 8 is an explanatory diagram showing an internal configuration of a connection module according to a third embodiment.
Figure 9:
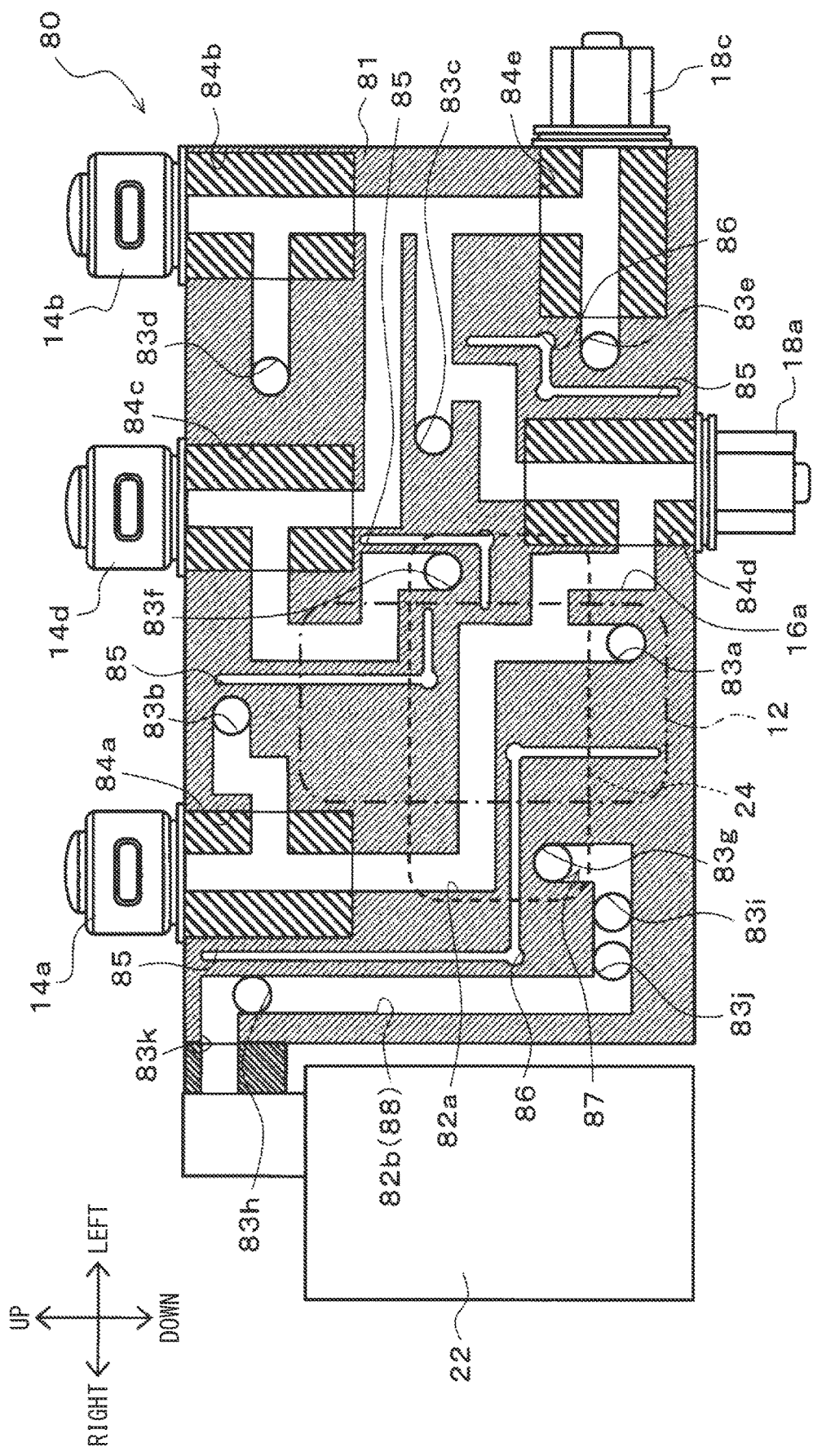
FIG. 9 is an explanatory diagram showing an internal configuration of a connection module to which a specific refrigerant flow path is added in the third embodiment.

Next, the connection module 80 according to a third embodiment will be described with reference to FIGS. 8 and 9. First, a basic configuration of the connection module 80 according to the third embodiment will be described. As shown in FIG. 8, the connection module 80 according to the third embodiment has the refrigerant flow path 82 formed in the body 81, the first to sixth connection ports 83*a* to 83*f*, and the first to fifth attachment portions 84*a* to 84*e*.

In other words, the connection module 80 according to the third embodiment is applied to the vehicle air conditioner 1 that does not have the cooling function of the battery 48 and an air conditioning function on the rear seat side. Therefore, as shown in FIG. 8, the connection module 80 according to the third embodiment does not have the refrigerant flow path 82 connecting the seventh to eleventh connection ports 83*g* to 83*k* in the body 81 as compared with the first embodiment.

In the third embodiment, it is assumed that the basic configuration of the connection module 80 has been changed due to the addition of a function to the vehicle air conditioner 1. Therefore, the refrigerant flow path 82 and the connection port that are not required for the addition of a function of the vehicle air conditioner 1 are added to the basic configuration of the connection module 80 shown in FIG. 8.

For example, when the vehicle air conditioner 1 is changed to a dual air conditioner with the cooling function of the battery 48, the refrigerant flow path 82 to which the seventh to the eleventh connection ports 83*g* to 83*k* are connected is formed in the body 81 of the connection module 80 shown in FIG. 8. In this case, the chiller 24 connected to the seventh connection port 83*g*, the rear seat evaporator 23 connected to the eighth connection port 83*h*, and the accumulator 22 connected to the eleventh connection port 83*k* correspond to examples of specific components according to the third embodiment.

The refrigerant flow path 82 connecting the seventh to eleventh connection ports 83*g* to 83*k* added in this case corresponds to an example of a specific refrigerant flow path 88. When the refrigerant flow path 82 connecting the seventh to eleventh connection ports 83*g* to 83*k* is added as the specific refrigerant flow path 88, a core forming a shape of the specific refrigerant flow path 88 is formed by using salt or the like, together with the core forming the shape of the refrigerant flow path 82 in the basic configuration shown in FIG. 8.

Along with the core of the refrigerant flow path 82 in the basic configuration, the core in the specific refrigerant flow path 88 is disposed at a predetermined position of the mold having a flat plate shape. After that, a molten metal is injected into the mold in which the core is disposed to cast the body 81. By melting and removing the core formed with salt or the like at a stage where the molten metal is solidified, the refrigerant flow path 82, the refrigerant flow path 82 including the specific refrigerant flow path 88 is formed inside the body 81 as shown in FIG. 9.

As described above, in the connection module 80 according to the third embodiment, the specific refrigerant flow path 88 in the components required by the addition of the function of the vehicle air conditioner 1 (that is, the specific components such as the chiller 24 and the rear seat evaporator 23) can be easily formed in the body 81. That is, the connection module 80 according to the third embodiment can flexibly support changes in the configuration of the refrigeration cycle 10 with a small number of work changes by adding the specific refrigerant flow path 88.

The configuration of the specific refrigerant flow path 88 is changed in accordance with the function added to the vehicle air conditioner 1 and the specific component. For example, when the cooling function of the battery 48 is added to the basic configuration of the vehicle air conditioner 1 according to the third embodiment, it is not necessary to form the eighth connection port 83*h* in the refrigerant flow path 82 extending from the seventh connection port 83*g* to the eleventh connection port 83*k*. That is, as the specific refrigerant flow path 88, the ninth connection port 83*i* and the tenth connection port 83*j* are formed on a midway of the refrigerant flow path 82 extending from the seventh connection port 83*g* to the eleventh connection port 83*k*.

When the basic configuration of the vehicle air conditioner 1 according to the third embodiment is changed to a dual air conditioner, the refrigerant flow path 82 extending from the eighth connection port 83*h* to the eleventh connection port 83*k* is formed as the specific refrigerant flow path 88.

As described above, in the connection module 80 according to the third embodiment, it is possible to obtain the effects obtained from the configuration and operation common to those of the embodiment in a similar manner as in the embodiment.

In the connection module 80 according to the third embodiment, the specific refrigerant flow path 88 corresponding to the specific component along with the addition of the function of the vehicle air conditioner 1 can be formed. Thus, the connection module 80 can flexibly support the addition of the function of the vehicle air conditioner 1 with a small number of man-hours.

Fourth Embodiment

Next, the connection module 80 according to a fourth embodiment will be described. The connection module 80 according to the fourth embodiment has the configuration according to the first embodiment as a basic configuration, and a case is shown where a function is reduced from the vehicle air conditioner 1 according to the first embodiment.

In the fourth embodiment, for example, a case will be described where the cooling function of the battery 48 and the air conditioning function on the rear seat side are reduced from the vehicle air conditioner 1 configured as a dual air conditioner with the cooling function of the battery 48.

As mentioned above, the chiller 24 associated with cooling of the battery 48 is connected to the seventh connection port 83*g* of the connection module 80. Further, the rear seat evaporator 23 associated with the air conditioning on the rear seat side is connected to the eighth connection port 83*h* of the connection module 80. Therefore, the rear seat evaporator 23 and the chiller 24 each correspond to an example of a target component.

Then, a case will be described where the cooling function of the battery 48 and the air conditioning function on the rear seat side are reduced. The inflow and outflow of the refrigerant to the rear seat evaporator 23 and the chiller 24 are not required, and of the refrigerant flow paths 82, the refrigerant flow path 82 connecting the seventh to eleventh connection ports 83*g* to 83*k* is not required. That is, the refrigerant flow path 82 connecting the seventh to eleventh connection ports 83*g* to 83*k* corresponds to a target refrigerant flow path 89 for the rear seat evaporator 23 and the chiller 24 as the target components.

Figure 10:
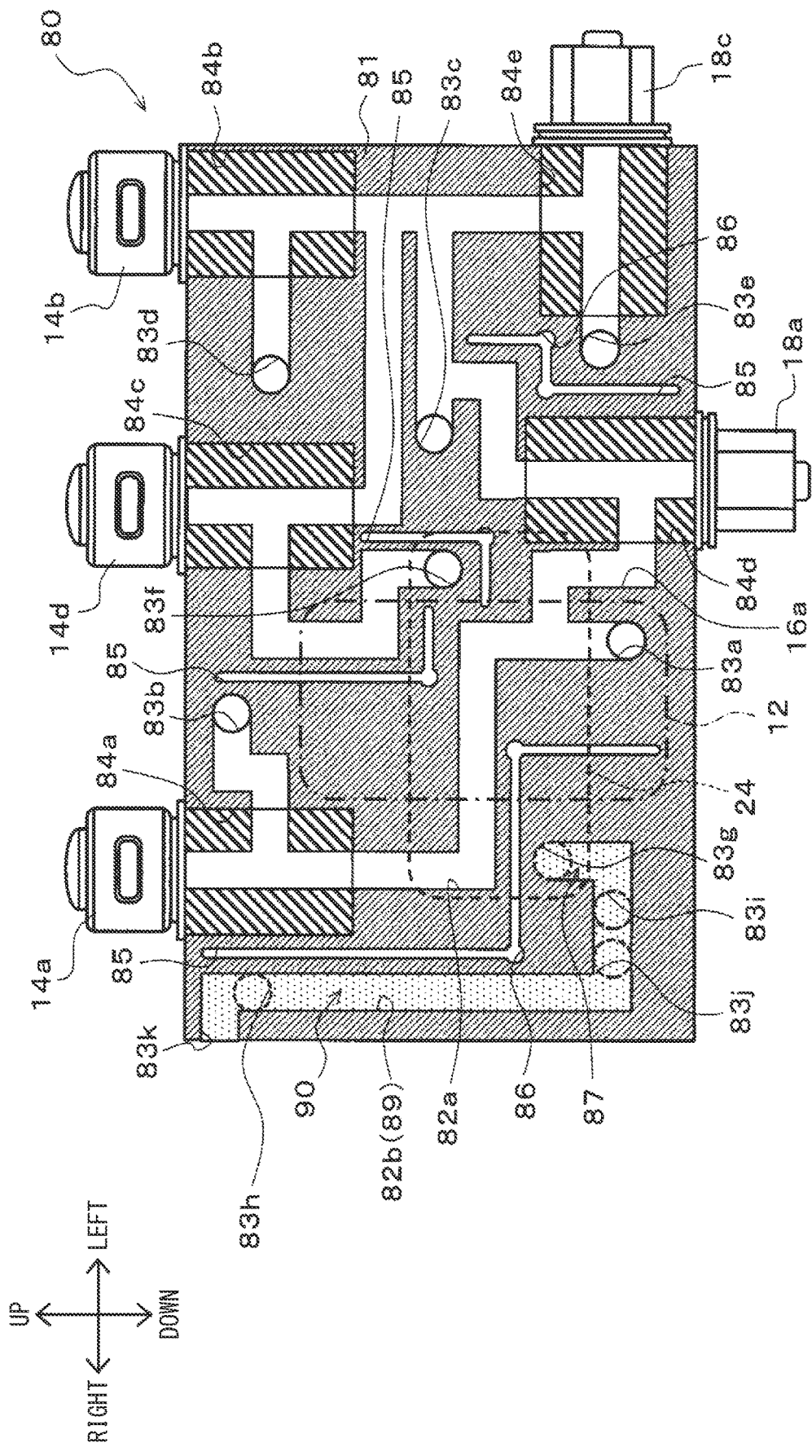
FIG. 10 is an explanatory diagram showing an internal configuration of a connection module according to a fourth embodiment.

In the connection module 80 according to the fourth embodiment, as shown in FIG. 10, a closing member 90 is provided in order to block the flow of the refrigerant in the target refrigerant flow path 89. The closing member 90 is filled inside the target refrigerant flow path 89 and closes the inside of the target refrigerant flow path 89. Since the seventh to eleventh connection ports 83*g* to 83*k* are disposed in the target refrigerant flow path 89, the closing member 90 also closes the inside of the seventh to eleventh connection ports 83g to 83k, respectively.

As a result, the connection module 80 according to the fourth embodiment can flexibly support the change in the configuration of the refrigeration cycle 10 due to the reduction of the function from the vehicle air conditioner 1 by using the closing member 90 with less work.

A configuration of the target refrigerant flow path 89 is changed in accordance with the function reduced from the vehicle air conditioner 1 and the target component. For example, when the air conditioning function on the rear seat side is reduced from the vehicle air conditioner 1 according to the first embodiment, the fifth attachment portion 84e and the eighth connection port 83h are closed by the closing member 90 in the refrigerant flow path 82 from the seventh connection port 83g to the eleventh connection port 83k. As a result, the connection module 80 is changed to a mode suitable for the vehicle air conditioner 1 having the cooling function of the battery 48 in addition to air conditioning for the vehicle interior as a whole.

When the cooling function of the battery 48 is reduced from the vehicle air conditioner 1 according to the first embodiment, the third attachment portion 84c and the seventh connection port 83g are closed by the closing member 90 in the refrigerant flow path 82 from the seventh connection port 83g to the eleventh connection port 83k. As a result, the connection module 80 is changed to a mode suitable for a dual air conditioner without the cooling function of the battery 48.

As shown in FIG. 10, in the fourth embodiment, the closing member 90 is disposed to be filled inside the target refrigerant flow path 89, and blocks the flow of the refrigerant in the target refrigerant flow path 89. However, the present invention is not limited to this aspect. As long as the flow of the refrigerant in the target refrigerant flow path 89 can be blocked, various aspects can be adopted as the closing member 90. For example, as the closing member 90, a member on a cap that closes a connection port constituting an end of the target refrigerant flow path 89 may be adopted. Alternatively, the target refrigerant flow path 89 may be removed from the connection module 80.

As described above, in the connection module 80 according to the fourth embodiment, it is possible to obtain the effects obtained from the configuration and operation common to those of the embodiment in a similar manner as in the embodiment.

In the connection module 80 according to the fourth embodiment, the target refrigerant flow path 89 corresponding to the target component excluded due to the reduction of the function of the vehicle air conditioner 1 can be closed by the closing member 90. Thus, the connection module 80 can flexibly support the reduction of the function of the vehicle air conditioner 1 with a small number of man-hours.

The present disclosure is not limited to the above embodiment, and can be variously modified as follows without departing from the gist of the present disclosure.

In the embodiment, the connection module 80 has a configuration in which the high-temperature-side flow path 82a and the low-temperature-side flow path 82b are provided as the refrigerant flow paths of the body 81, but the present invention is not limited to this configuration.

A heat medium flow path through which another heat medium flows may be formed in the body 81 of the connection module 80. For example, a heat medium flow path through which the high-temperature-side heat medium of the high-temperature-side heat medium circuit 40 flows may be formed, or a heat medium flow path through which the low-temperature-side heat medium of the low-temperature-side heat medium circuit 45 flows may be formed. Further, a detector such as a temperature sensor or a pressure sensor may be attached to the body 81 of the connection module 80.

The heat transfer inhibiting portion 85 in the embodiment is formed in a groove shape in the body 81, but each heat transfer inhibiting portion 85 may have a groove shape in which either the front surface or the rear surface of the body 81 is recessed. The heat transfer inhibiting portion 85 may have a groove shape in which both the front surface and the rear surface of the body 81 are recessed. Further, the heat transfer inhibiting portion 85 may have a slit shape penetrating between the front surface and the rear surface of the body 81.

Although it is assumed that air exists inside the heat transfer inhibiting portion 85, the present invention is not limited to this aspect. The heat transfer inhibiting portion 85 can adopt various aspects as long as the heat transfer inhibiting portion 85 can inhibit the heat transfer between the high-temperature-side flow path 82a and the low-temperature-side flow path 82b. For example, the inside of the heat transfer inhibiting portion 85 may be filled with a material having low thermal conductivity.

Further, in the above embodiment, the deformation absorber 86 is formed so as to have a columnar internal space, but the present invention is not limited to this aspect. As long as the deformation on the side of the high-temperature-side flow path 82a with respect to the heat transfer inhibiting portion 85 and the deformation on the side of the low-temperature-side flow path 82b with respect to the heat transfer inhibiting portion 85 can be absorbed, a shape of the deformation absorber 86 can be changed appropriately.

In the embodiment, the deformation absorber 86 is disposed at the corner of the heat transfer inhibiting portion 85, but the present invention is not limited to this aspect. For example, the deformation absorber 86 may be disposed at an end of the heat transfer inhibiting portion 85 having a groove shape. The deformation absorber 86 only needs to be disposed in the heat transfer inhibiting portion 85, and may be disposed in a center of the heat transfer inhibiting portion 85 extending linearly.

In the embodiment, the first to fifth attachment portions 84a to 84e are formed in the body 81 of the connection module 80, but the present invention is not limited to this configuration. The number and arrangement of the attachment portions in the body 81 can be appropriately changed in accordance with the configuration of the refrigeration cycle 10.

The fluid control device attached to the first to fifth attachment portions 84a to 84e is not limited to the embodiment, and can be appropriately changed in accordance with the configuration of the refrigeration cycle 10. For example, in the embodiment, the third open/close valve 18c is attached to the fifth attachment portion 84e, but may be changed to an electric expansion valve having a full close function. That is, the third open/close valve 18c and the second cooling expansion valve 14c as a thermal expansion valve can be replaced with an electric expansion valve having a full close function.

In this case, depending on the operation mode, the low-pressure refrigerant decompressed by the electric expansion valve may flow through the refrigerant flow path 82 extending from the right side surface of the fifth attachment portion 84e to the fifth connection port 83e. Therefore, the heat transfer inhibiting portion 85 disposed to the right and above the fifth connection port 83*e* can suppress the influence of heat between the refrigerant flow path extending from the upper surface of the fourth attachment portion 84*d* and the refrigerant flow path 82 extending from the fifth attachment portion 84*e* to the fifth connection port 83*e*.

In the embodiment, the refrigerant flow path 82 extending downward in the gravitational direction from the seventh connection port 83*g* is defined as the inhibiting portion 87, but the present invention is not limited to this aspect. As long as the refrigerant flowing from the ninth connection port 83*i* and the tenth connection port 83*j* can flow into the eighth connection port 83*h*, the inhibiting portion can adopt various modes.

Figure 11:
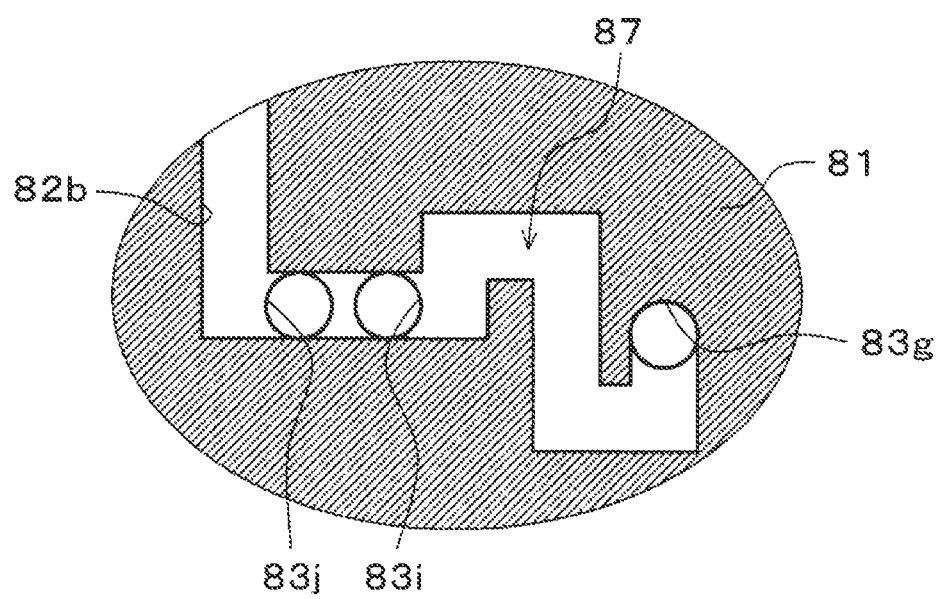
FIG. 11 is an enlarged view showing a modification of an inhibiting portion in a connection module.

For example, as shown in FIG. 11, a configuration may be provided as the inhibiting portion 87 in which the refrigerant flow path 82 between the eighth connection port 83*h* and the ninth and tenth connection ports 83*i* and 83*j* is raised to pass above at least the ninth connection port 83*i* and the tenth connection port 83*j* in the gravitational direction. This configuration can restrict the refrigerant flowing out from the ninth connection port 83*i* and the tenth connection port 83*j* from flowing into the eighth connection port 83*h* when the eighth connection port 83*h* is located below the ninth connection port 83*i*.

It is also possible to constitute the inhibiting portion 87 by arranging a check valve in the refrigerant flow path 82 between the eighth connection port 83*h* and the ninth and tenth connection ports 83*i* and 83*j*. The check valve in this case is attached so as to allow the flow of the refrigerant from the eighth connection port 83*h* to the ninth and tenth connection ports 83*i* and 83*j* and restrict the flow of the refrigerant from the ninth and tenth connection ports 83*i* and 83*j* toward the eighth connection port 83*h*.

The body 81 of the connection module 80 according to the present disclosure may include one or a plurality of blocks. For example, the body 81 of the connection module 80 may be configured by combining and integrating a plurality of blocks with bolts or the like. For example, the body 81 may be configured by combining and integrating a basic body in which the refrigerant flow path 82 of a basic configuration of the refrigeration cycle 10 is formed and a specific body in which the refrigerant flow path 82 associated with a specific component is formed. In this case, it is possible to support a change of function of the vehicle air conditioner 1 or the like by attaching or detaching the specific body to or from the basic body in accordance with the change of function of the vehicle air conditioner 1 or the like.

Then, in the embodiment, an example in which R1234yf is adopted as the refrigerant of the refrigeration cycle 10 has been described, but the refrigerant is not limited to this refrigerant. For example, R134a, R600a, R410A, R404A, R32, R407C, and the like may be adopted. Alternatively, a mixed refrigerant or the like in which a plurality of the above refrigerants are mixed may be adopted.

The high-temperature-side heat medium circuit 40 and the low-temperature-side heat medium circuit 45 are not limited to the configurations disclosed in the embodiment. For example, in the embodiment, an example has been described in which an ethylene glycol aqueous solution is used as a heat medium, but the present invention is not limited thereto. As the heat medium, dimethylpolysiloxane, a solution containing nanofluid or the like, an antifreeze liquid, an aqueous liquid refrigerant containing alcohol or the like, or a liquid medium containing oil or the like may be adopted.

Then, in the embodiment, an example of cooling the battery 48 as a cooling target has been described, but the cooling target is not limited to the battery 48. As the cooling target, an in-vehicle device that generates heat during operation, such as an inverter, a motor generator, a power control unit (so-called PCU), a control device for an advanced driver assistance system (so-called ADAS), or the like may be adopted.

Although having been described in accordance with examples, the present disclosure should not be limited to the examples and structures. The present disclosure also includes various modifications and changes within the range of equivalency. In addition, various combinations and forms, as well as other combinations and forms that include only one element, more, or less, are within the scope and range of spirit of the present disclosure.

What is claimed is:

1. A connection module to which a plurality of components of a refrigeration cycle are connected, the connection module comprising
a body having a refrigerant flow path that constitutes a part of a path for a refrigerant in the refrigeration cycle, wherein
the refrigerant flow path includes
a high-temperature-side flow path having a connection port to which a high-temperature-side component of the plurality of components is connected, through which the refrigerant of the high-temperature-side flow path having a high-pressure flows, and
a low-temperature-side flow path having a connection port to which a low-temperature-side component of the plurality of components is connected, through which the refrigerant of the low-temperature-side flow path having a lower temperature than the refrigerant of the high-temperature-side flow path flows, wherein
the refrigerant is configured to refrigerate machine oil,
the low-temperature-side component is an evaporator that evaporates the refrigerant of the low-temperature-side flow path having a lower pressure than the refrigerant of the high-temperature-side flow path,
the refrigerant flow path has an inlet side connection port that guides the refrigerant having a low-pressure to an inflow port of the evaporator and an outlet side connection port connected to an outflow port of the evaporator,
the outlet side connection port is located below the inlet side connection port in a gravitational direction of the body,
the low-temperature-side component has a main evaporator connected separately from the evaporator, and
the low-temperature-side flow path extending from the outlet side connection port includes a main connection port connected to an outflow port of the main evaporator and an inhibiting portion that restricts the refrigerant having a low-pressure having flowed in from the main connection port from flowing into the outlet side connection port.

2. The connection module according to claim 1, wherein the high-temperature-side component is a heat medium refrigerant heat exchanger integrated with the body through the connection port of the refrigerant flow path to condense the refrigerant in the refrigeration cycle having a high-pressure to heat a heat medium.

3. The connection module according to claim 1, wherein the low-temperature-side component is an evaporator integrated with the body through the connection port of the refrigerant flow path to absorb heat to evaporate the refrigerant.

4. The connection module according to claim 1, wherein the body includes a heat transfer inhibiting portion having a groove shape provided between the high-temperature-side flow path and the low-temperature-side flow path and having lower thermal conductivity than the body.

5. The connection module according to claim 4, wherein the heat transfer inhibiting portion includes a deformation absorber defined in part by the groove shape for absorbing deformation of the body adjacent to the high-temperature-side flow path and deformation of the body adjacent to the low-temperature-side flow path.

6. The connection module according to claim 1, wherein
the low-temperature-side component further includes a secondary evaporator through which the refrigerant having a low-pressure flows when the refrigerant having a low-pressure flows through at least the main evaporator, and
the low-temperature-side flow path extending from the outlet side connection port includes an auxiliary connection port connected to an outflow port of the secondary evaporator, and the auxiliary connection port is located downstream of the main connection port in a flow of the refrigerant having a low-pressure in the low-temperature-side flow path.

7. The connection module according to claim 1, wherein the body has an attachment portion having a recessed shape to allow a part of a heating expansion valve to control the flow of the refrigerant to enter the refrigerant flow path.

8. The connection module according to claim 1, wherein a flow path cross-sectional area at a bent portion in the refrigerant flow path is larger than a flow path cross-sectional area at a straight portion in the refrigerant flow path.

9. The connection module according to claim 1, wherein
the refrigerant flow path has a specific refrigerant flow path in which the refrigerant flows through a specific component added as the component of the refrigeration cycle, and
the specific refrigerant flow path is disposed in the body.

10. The connection module according to claim 1, wherein the body has an attachment portion having a recessed shape to allow a part of a three-way joint to control the flow of the refrigerant to enter the refrigerant flow path.

11. The connection module according to claim 1, wherein the inhibiting portion that restricts the refrigerant having a low-pressure having flowed in from the main connection port from flowing into the outlet side connection port is defined in part by the refrigerant flow path extending downward from the outlet side connection port.

12. The connection module according to claim 1, wherein the inhibiting portion that restricts the refrigerant having a low-pressure having flowed in from the main connection port from flowing into the outlet side connection port is a check valve arranged in the refrigerant flow path.

* * * * *